United States Patent [19]

Heckenbach et al.

[11] Patent Number: 4,630,221

[45] Date of Patent: * Dec. 16, 1986

[54] ZONE CONDITION CONTROLLER AND METHOD OF USING SAME

[75] Inventors: Terry A. Heckenbach, Middlebury; Henry A. Gleason, III, Goshen, both of Ind.

[73] Assignee: Johnson Service Company, Milwaukee, Wis.

[ * ] Notice: The portion of the term of this patent subsequent to Oct. 7, 2003 has been disclaimed.

[21] Appl. No.: 629,086

[22] Filed: Jul. 9, 1984

Related U.S. Application Data

[63] Continuation-in-part of Ser. No. 505,224, Jun. 17, 1983.

[51] Int. Cl.[4] .......................... G06F 15/20; F24F 3/00
[52] U.S. Cl. ...................................... 364/505; 165/14; 165/22; 236/1 B
[58] Field of Search ...................... 364/505, 506, 557; 165/11 R, 13, 14, 22, 50; 236/1 B, 46 R, DIG. 1

[56] References Cited

U.S. PATENT DOCUMENTS

| | | | |
|---|---|---|---|
| 4,173,754 | 11/1979 | Feiker | 364/505 |
| 4,215,408 | 7/1980 | Games et al. | 364/505 |
| 4,253,153 | 2/1981 | Bitterli et al. | 364/505 |
| 4,430,828 | 2/1984 | Oglevee et al. | 364/505 |

Primary Examiner—Errol A. Krass
Assistant Examiner—H. R. Herndon
Attorney, Agent, or Firm—Larry L. Shupe; Joseph J. Jochman; John Phillip Ryan

[57] ABSTRACT

An electrically-powered zone condition control apparatus includes a first multiplexing means adapted for receiving analog status signals emanating from a plurality of passive signaling devices such as temperature or humidity sensors or potentiometers and transmitting these status signals in multiplex fashion to an analog-to-digital converter. The converter changes these analog status signals to digital data signals and directs them to a microcomputer. A second multiplexing means receives binary input signals which may indicate, for example, that an electrical contact is open or closed and also transmits these signals in multiplex fashion to the microcomputer. The microcomputer is adapted to perform algorithmic decisional functions relative to the signals received therein and is adaptable to periodically, selectively transmit digital output signals to one or more of a plurality of digitally-addressable load devices coupled to it by a two-wire communication bus. The microcomputer is also adaptable to periodically receive digital input signals from one or more of the load devices.

A method for controlling a condition in a zone, temperature for example, includes the steps of generating a plurality of signals representative of the status of a plurality of signalling devices, converting selected status signals to digital data signals and directing the data signals and unconverted status signals to a computing means such as a microcomputer. The microcomputer performs algorithmic decisional functions relative to the signals received thereat and periodically, selectively transmits digital output signals along a communication bus to one or more of a plurality of uniquely, digitally addressable load devices. Digital input signals are periodically received from one or more of the load devices.

7 Claims, 16 Drawing Figures

ZONE CONDITION CONTROLLER AND METHOD OF USING SAME

BACKGROUND OF THE INVENTION

This application is a continuation-in-part of co-pending application Ser. No. 06/505,224 filed on June 17, 1983 by the same inventive entity as this application and entitled "Zone Condition Controller and Method of Using Same".

This invention relates generally to process control apparatus and more particularly to a first level zone condition control apparatus for controlling the operation of heating, ventilating, humidifying and air conditioning (HVAC) equipment to effect environmental conditioning.

Computerized control systems are in wide use for controlling a variety of processes, petrochemical, power generation and steel making being exemplary. Typically, each such process comprises a plurality of process subsystems or zones which may have control requirements peculiar thereto and which may be controlled by an apparatus dedicated to the proper functioning of the particular zone. Such controllers are usually coupled to a more sophisticated, master controller disposed at a second or higher hierarchical level within the overall control system and coupled to the first level controllers by a communication bus. For processes having a relatively small number of parameters to be sensed and controlled, it is desirable to employ a zone controller which is constructed and arranged to define a less sophisticated and therefore less expensive apparatus which is carefully matched to the parameters of the zone being controlled.

Another type of process which may require zone control or which may be adapted to control by zones includes environmental processes related to heating, ventilating, humidifying and air conditioning. Sophisticated and relatively expensive hierarchical systems are known and in common use for controlling the HVAC systems in locations such as large office buildings, universities, industrial complexes and the like. Such systems will usually include a master control computer coupled to a number of subcontrollers which are distributed throughout a building and are capable of more limited computerized function. These subcontrollers, in turn are typically coupled to a number of individual modules and load devices for controlling the HVAC equipment. While these systems provide highly acceptable performance in those installations, their complexity and resultant cost makes them undesirable for use in smaller HVAC processes such as might be found in supermarkets, smaller warehouses, office buildings and the like. In constructions of this latter type, the HVAC equipment will typically include only a single set of interrelated ducts, termed an air handling unit, coupled to a zone or space, the temperature and/or humidity environment of which is to be controlled. While these spaces are most frequently intended for human occupancy, such spaces may be devoted to the storage of food or other goods requiring a closely-controlled ambient.

The ducts comprising the air handling unit are constructed and arranged for drawing outdoor ambient air into the space, for exhausting air from the space to the outdoor ambient and for controllably mixing intake and return air. Such air handling units are equipped with adjustable dampers for controlling the flow of air and include heat dissipating or absorbing coils formed of tubing placed in the air flow path within the duct. These coils may be arranged in two sets, one each for flowing heated or chilled water or refrigerant therethrough, thereby permitting the duct air temperature to be raised or lowered. Valves are provided for controlling water flow. These dampers and valves may be controllably positioned by load devices such as motorized rotary actuators coupled thereto.

In the alternative, a water-type heater coil may be replaced by a group of electrically-powered heater strips which may be energized in one or more stages for air heating. These heater strips may be energized by a load device such as a sequencer in response to command signals received by it. Control of the load devices, the exemplary actuators and sequencers, may be in discrete stages or in a continuum.

In systems of this type, energy savings may be realized by incorporating economizing functions within the control scheme. For outdoor air temperature and humidity which fall within a predetermined band of temperature and humidity values, the cooling effect inherent in the outdoor air may be utilized for appropriate conditioning of the space while yet avoiding the expenditure of supplemental energy for this function.

One type of microcomputer-based zone controller incorporates a small number of resistive elements, the output signals of which are used by the controller for selecting the desired setpoints of certain process parameters or for sensing temperature and relative humidity values. Such controllers are arranged around a centralized intelligence concept; that is, the data management and computational algorithms are embodied exclusively in the controller microcomputer or microprocessor and associated memory functions. The load devices to be connected to and operated by the controller include no provision for device programming, memory function or communication with the controller. Such a controller incorporates one or more multiplexers for sequentially directing sensed and setpoint parameters to a microcomputer for processing. Signals so processed are inverted and used to selectively energize one or more of a plurality of controller-mounted electromagnetic relays for actuating staged heating, cooling or a combination thereof. Other signals as, for example, from a heat-/cool changeover switch are inverted, directed to a comparator network and used to positionably control a rotatable actuator for powering outdoor air dampers. A potentiometer is used to select that actuator position which provides the minimum air flow required for ventilation. With such a controller, each heating and/or cooling stage would be coupled to a predetermined set of relay output contacts by a pair of wires, both the contacts and the wire pair associated therewith being dedicated solely to the task of controlling the particular stage coupled thereto. Economizer control by a method known as differential enthalpy may be accomplished only by connection of a separate enthalpy control module to the controller. An example of such a zone controller is shown and described in U.S. Pat. No. 4,347,712.

While such zone controllers have hitherto provided a satisfactory means for controlling HVAC equipment, they tend to be characterized by certain disadvantages. In particular, each controller relay contact is required to have a pair of dedicated wires coupled between it and the associated heating or cooling stage. The analog output terminals for controlling the economizer motor are likewise required to have a pair of dedicated conductors coupled thereto. Since the distances between the controller and the economizer motor or heating and cooling stages may be substantial, the cost of installing this wiring, eight or more conductors in all, may be quite significant. Additionally, the controller microcomputer, having a predetermined number of input/output ports, may be bound by the number of such ports to a maximum number and type of load devices connected to the controller. Therefore, if a process control application requires an output configuration other than that which may be available from the predetermined number of relay output contacts and analog output terminals, it will be necessary to modify the controller and its self-contained hardware in order to accommodate the controller to such an application. It is difficult or impossible to adapt a controller of this type to a system wherein the combined number of heating and cooling stages exceeds the relatively limited number of electromagnetic output relays embodied in the controller. Another disadvantage of such a controller relates to the fact that HVAC air handling units tend to have varying numbers of heating, humidifying and/or cooling stages required from application to application. Notwithstanding, it may be highly desirable from comfort and energy conservation standpoints to cause the progressive energization or de-energization of the heating and cooling stages to occur in evenly-spaced increments across the width, in temperature degrees, of the heating or cooling proportional bands, irrespective of the width of these bands or of the number of heating or cooling stages. Known zone controllers are somewhat inflexible and therefore not easily adapted to such operating environments.

Yet a further disadvantge of a controller of this type which uses a system of centralized intelligence is that no means are included whereby the controller may selectively poll or otherwise communicate with the load devices coupled thereto. The controller is therefore unable to identify, by digitally coded signals, the precise type of load device coupled thereto nor to interrogate and receive signals from the load devices indicative of their respective positions or status.

A zone controller which utilizes a microcomputer and is adapted to control microcomputer-based load devices such as actuators and sequencers to form a system having distributed intelligence, which is capable of communicating with any one or all of a plurality of such load devices by a single, two-wire communication bus coupled therebetween, which is adapted to communicate with such load devices by a pair of microcomputer digital signal input/output (I/O) ports and which is adapted to communicate with a central processing unit at a higher hierarchical level would be a significant advance over the prior art.

SUMMARY OF THE INVENTION

In general, the electrically-powered zone condition control apparatus of the present invention includes a first multiplexing means adapted for receiving analog status signals emanating from a plurality of passive signaling devices such as temperature or humidity sensors or potentiometers and transmitting these status signals in multiplex fashion to computing means such as an analog-to-digital converter. The converter changes these analog status signals to digital data signals and directs them to computing means such as a microcomputer. A second multiplexing means receives binary input signals which may indicate, for example, that an electrical contact is open or closed and also transmits these signals in multiplex fashion to the computing means. The microcomputer is adapted to perform algorithmic decisional functions relative to the signals received therein and is adaptable to periodically, selectively transmit digital output signals to one or more of a plurality of digitally-addressable load devices coupled to it by a two-wire communication bus. The microcomputer is also adaptable to periodically receive digital input signals from one or more of the load devices.

A method for controlling an environmental condition in a zone includes the steps of generating a plurality of signals representative of the status of a plurality of signalling devices, converting selected status signals to digital data signals and directing the data signals and unconverted status signals to a computing means such as a microcomputer. The microcomputer performs algorithmic decisional functions relative to the signals received thereat and periodically, selectively transmits digital output signals along a communication bus to one or more of a plurality of uniquely, digitally addressable load devices. Digital input signals are periodically received from one or more of the load devices.

In a preferred embodiment, the controller includes a power supply adapted to receive an input voltage of 24VAC and generate a plurality of output voltages for utilization throughout the controller. The first multiplexing means includes a first multiplexer, a second multiplexer and a third multiplexer, the first multiplexer being adapted to receive analog voltage signals from a plurality of control parameter sensors such as those used to sense temperature and/or humidity. The second multiplexer receives analog voltage signals representative of the status or settings of a first group of potentiometers while a third multiplexer similarly receives analog voltage signals representative of the status or settings of a second group of potentiometers. As commanded by the computing means, the first, second and third multiplexers serially transmit analog status signals to converter means embodied as an analog-to-digital converter. The converter means is adapted to convert the analog status signals to digital data signals representative of those status signals and direct the data signals to the microcomputer. The controller also includes second multiplexing means adapted to receive a group of binary status signals and serially transmit those signals to the microcomputer upon its command. A signal-amplifying buffer circuit is coupled between the microcomputer and the level 1 communication bus which links the controller with a plurality of microprocessor-based, controlled load devices.

Optionally, the controller may also include a second buffer circuit for linking the controller with a master controller at a higher hierarchical level by a level 2 communication bus. If the zone controller is so linked, it preferably includes address selection means whereby a user may select any one of a plurality of digitally-coded addresses to which the controller will be responsive to a higher level controller coupled thereto by the level 2 bus.

The preferred controller is capable of receiving, upon request, coded signals from a sequence panel coupled to the controller by the level 1 bus, such signals representing the number of electromagnetic relays embodied in the sequence panel and available for the control of heating and/or cooling stages. The controller is adaptable to automatically cause these stages to be energized and de-energized in predetermined incremental spacing including evenly spaced increments across the heating or cooling proportional bands.

It is an object of the invention to provide a zone condition controller which is adapted to control microcomputer-based load devices in a condition control system having distributed intelligence.

Another object of the invention is to provide a controller which is capable of communicating with any one or all of a plurality of such load devices by a single, two-wire communication bus coupled therebetween.

Yet another object of the invention is to provide a controller which is adapted to communicate with microcomputer-based load devices by a pair of microcomputer digital signal input-output ports.

Still another object of the invention is to provide a controller adapted to communicate with a master controller at a higher hierarchical level.

Another object of the invention is to provide a condition controller capable of receiving both analog and digital status signals from temperature and humidity sensors, setpoint potentiometers, relay contacts and the like.

Another object of the present invention is to provide a general purpose controller capable of being adapted to a wide variety of control strategies by effecting a change only in the microcomputer programming.

Yet another object of the present invention is to provide a zone controller adaptable to automatically cause heating and/or cooling stages to be energized and de-energized in increments of predetermined spacing across the heating or cooling proportional bands. These and other objects of the invention will become more apparent from the detailed description thereof taken with the accompanying drawing.

DESCRIPTION OF THE PREFERRED EMBODIMENT

Figure 1:
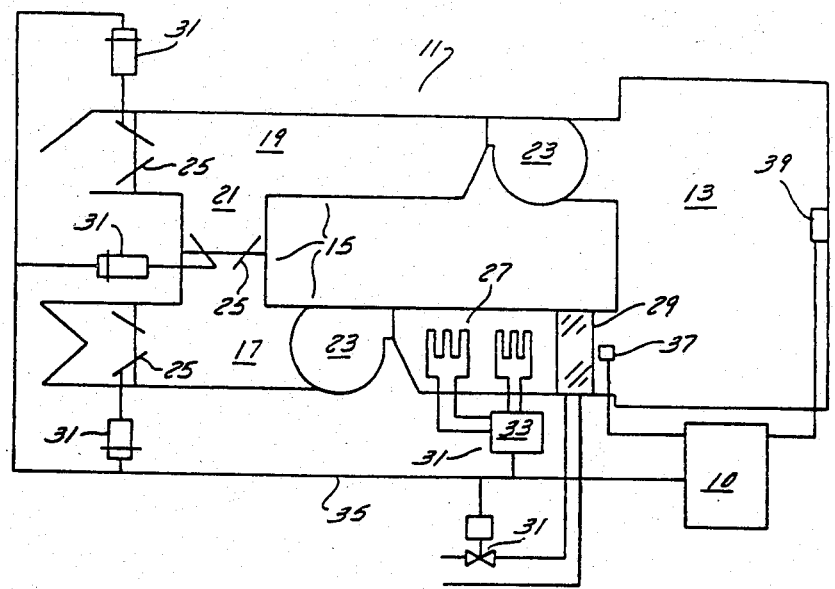
FIG. 1 is a simplified pictorial view of a typical air handling unit to which the controller of the present invention may be coupled.

In FIG. 1, the zone condition controller 10 is shown in connection with an air handling unit 11 which is utilized to control the temperature and/or humidity in a conditioned space 13 such as, for example, a supermarket, small group of offices, or the like. A typical air handling unit 11 is formed of sheet metal constructed and arranged to define a plurality of passageways or ducts 15, each having a square or rectangular cross-section. The air handling unit 11 includs a first duct 17 for directing air from the outdoor ambient to the space, a second duct 19 for exhausting air from the space to the outdoor ambient and a cross duct 21 for air mixing. Fans 23 are provided for air movement. The ducts 15 include louvered dampers 25 which may be positioned for controlling the amount of air flowing therethrough. Disposed within the first duct 17 is a plurality of electrically-powered heater strips 27 which, when energized, heat the air which is discharged into the space 13. The first duct 17 also includes a chiller coil 29 disposed therein for air cooling. The amount of cooling fluid flowing through the chiller coil 29 and the position of the dampers 25 may each be independently controlled by a load device 31 as, for example, a motorized rotary actuator. Selective energization of the heater strips 27 is by another type of load device, a sequence panel 33 described below. The load devices 31 are preferably microcomputer-based and are adapted to receive digital command signals from the controller 10 by a two-wire, level 1 bus 35 linking the controller 10 and the load devices 31. The load devices 31 are also adapted to transmit certain signals to the controller 10 via the bus 35. An example of a suitable load device 31 embodied as a microprocessor-based rotary actuator is shown in continuation-in-part U.S. Pat. No. 4,534,511, entitled "Controllable Rotary Actuator" which was patented on Apr. 22, 1986, and is assigned to the same assignee as this invention. The aforementioned application is incorporated herein by reference.

A temperature sensor 37 is disposed in the first duct 17 adjacent the cooling coil 29 for transmitting an analog signal to the controller 10 which is representative of the temperature of the air being discharged into the conditioned space 13. A setpoint potentiometer 39 may be disposed within the space 13 for selection of the temperature which is desired to be maintained therein. As will be apparent from the following description, this and other setpoint potentiometers may be incorporated into the controller 10 itself to help prevent unauthorized adjustment thereof. Additionally, one or more humidity sensors (not shown) may be disposed in the space 13 for sensing the relative humidity therein.

Figure 2:
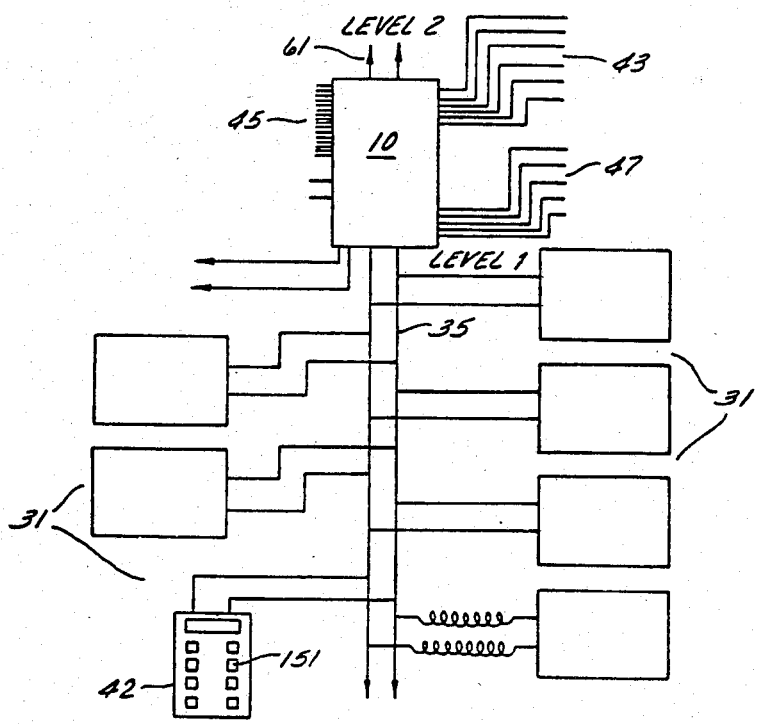
FIG. 2 is a simplified electrical schematic diagram showing the inventive controller coupled to a plurality of load devices by a communication bus.

Referring now to FIG. 2, the controller 10 is shown to be coupled to a level 1, two-wire communication bus 35 to which is attached a plurality of load devices 31. In addition to the actuators and sequencers described above, these load devices 31 may include a status panel 41, a service module 42 and/or additional sensors (not shown) which may be constructed using microcomputer-based circuitry and such "intelligent" sensors would thereby be capable of generating and transmitting digital signals back to the controller 10 via the bus 35 in response to controller signals. It should be appreciated that the mixture of load devices 31 coupled to the level 1 bus may include any combination of those types of devices described above. Further, the disclosed controller 10 is capable of communicating with up to 24 such load devices 31 and the use of a repeater would permit an even greater number of load devices 31 to be utilized.

The controller 10 is adapted to receive a first group of analog voltage signals at a first group of input terminals 43, the terminals 43 being wired to sensors such as sensor 37 which generate these voltage signals in response to the temperature or humidity of the air immediately surrounding the sensor. The controller 10 also includes a second group of input terminals 45 adapted to be wired to resistive devices such as potentiometers in order that a second group of analog voltage signals representative of the status or settings of those potentiometers may be received into the controller 10.

The controller also includes a third group of input terminals 47 for receiving binary input signals, typically indicative of the energized or de-energized state of an item of equipment associated with the HVAC system. For example, such a binary input signal may indicate whether or not a fan, pump or humidifier motor is operating.

Briefly stated, the controller 10 functions to compare the desired temperature or humidity at a particular location in the system, space 13 for example, and as represented by a setpoint signal with the actual temperature or humidity at the same location and as represented by the sensor signals. Based upon the results of that comparison, the controller 10 selectively generates error signals and transmits an appropriate command or group of commands by specific address to one or more of the load devices 31 coupled to the bus 35. Such command signals are generated to cause system adjustments which will reduce or eliminate the error between the signals being compared.

Figure 3:
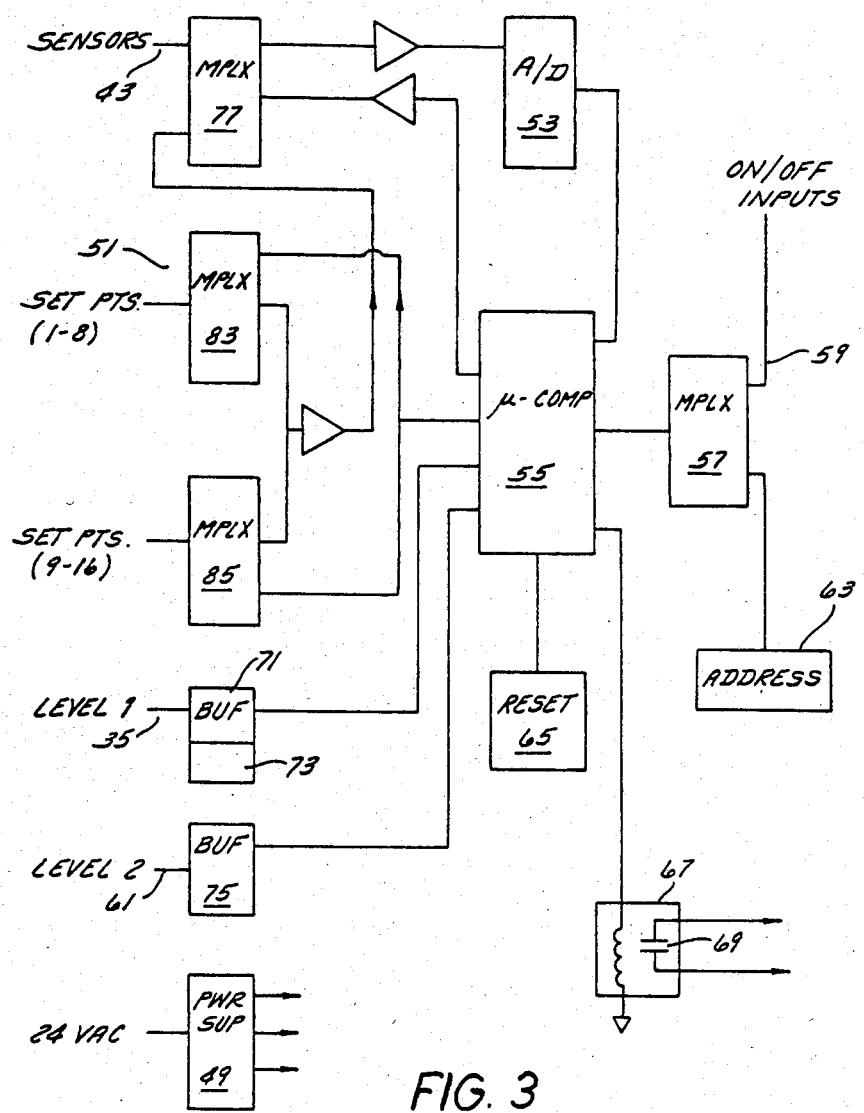
FIG. 3 is a simplified electrical schematic diagram of the controller of the present invention.

In FIG. 3, the controller is shown to include a power supply 49 for providing a plurality of output voltages to the controller 10. A first multiplexing means 51 is coupled to the power supply 49 and is arranged for receiving analog status signals emanating from a plurality of signaling devices such as temperature or humidity sensors or potentiometers and transmitting these status signals in multiplex fashion to an analog-to-digital converter 53. The converter 53 changes these analog status signals to digital data signals and directs them to computing means 55 such as a microcomputer. A second multiplexing means 57 receives binary input signals along a first channel 59 and these input signals may indicate, for example, that an electrical contact is opened or closed. These binary signals are similarly transmitted in multiplex fashion to the computing means 55. Referring additionally to FIG. 2, the preferred controller 10 is also equipped with circuitry which permits several such controllers or other digitally-addressable devices to be linked by a level 2 bus 61 to a central processing unit (CPU—not shown) located at a higher hierarchical level. By properly coded address signals, the CPU may selectively communicate with any one of the controllers or devices linked thereto. Accordingly, the controller 10 also includes an address selection means 63 whereby a user may select any one of a plurality of digitally-coded address signals, preferably eight, to which the controller 10 will be responsive when such a CPU-generated signal is received by the controller 10 from the level 2 bus 61.

At certain times during the operation of the controller 10, it is preferable to generate a reset signal for bringing the controller microcomputer 55 to a predetermined state. Internal reset is desirable upon the first application of power to the controller 10 as well as periodically thereafter and, accordingly, a reset circuit 65 is provided for generating such signals.

An optional feature of the controller 10 is the provision of an electromagnetic relay 67 which may be discretionarily used by the system installer. The relay contact 69 may be used, for example, to operate a fan or may be used to sound an alarm in the event of a controller malfunction.

The controller microcomputer 55 is coupled to the level 1 bus 35 by a transmit-mode amplifying buffer circuit 71 which converts the very low power digital signals emanating from the microcomputer 55 into digital signals of a power level sufficient to operate the load devices 31 coupled to the bus 35. A receive-mode buffer circuit 73 conditions bus signals to a digital form unimpaired by spurious noise for best utilization by the microcomputer 55. In the event that it is desired to use the zone controller 10 in conjunction with a CPU linked thereto by the level 2 bus 61, the controller 10 also includes an amplifying buffer circuit 75 to facilitate such communications.

Figure 4A:
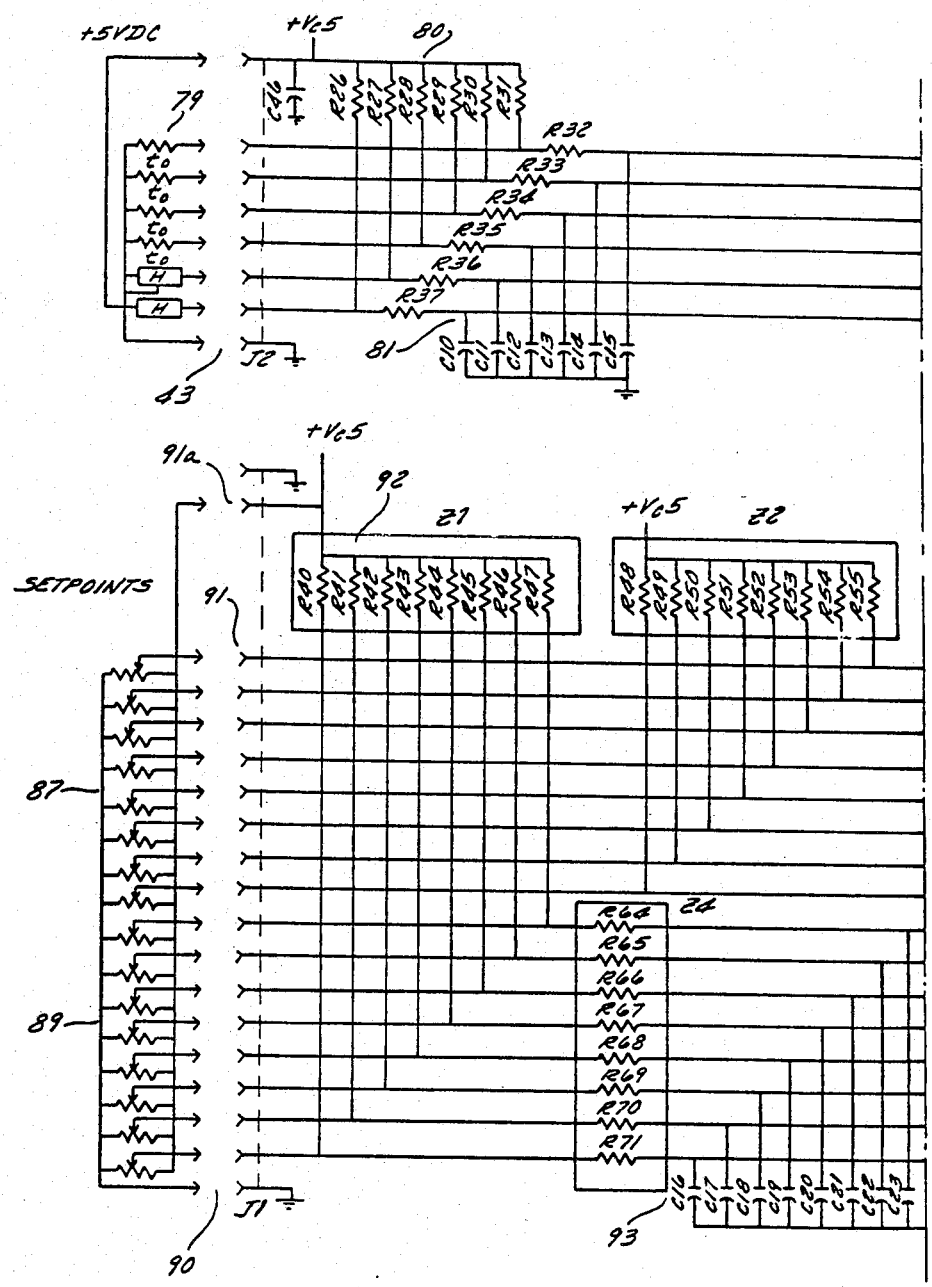
FIGS. 4A and 4B, taken together, comprise the electrical schematic diagram of the first multiplexer means and circuitry associated therewith, all forming a portion of the controller of the present invention.
Figure 4B:
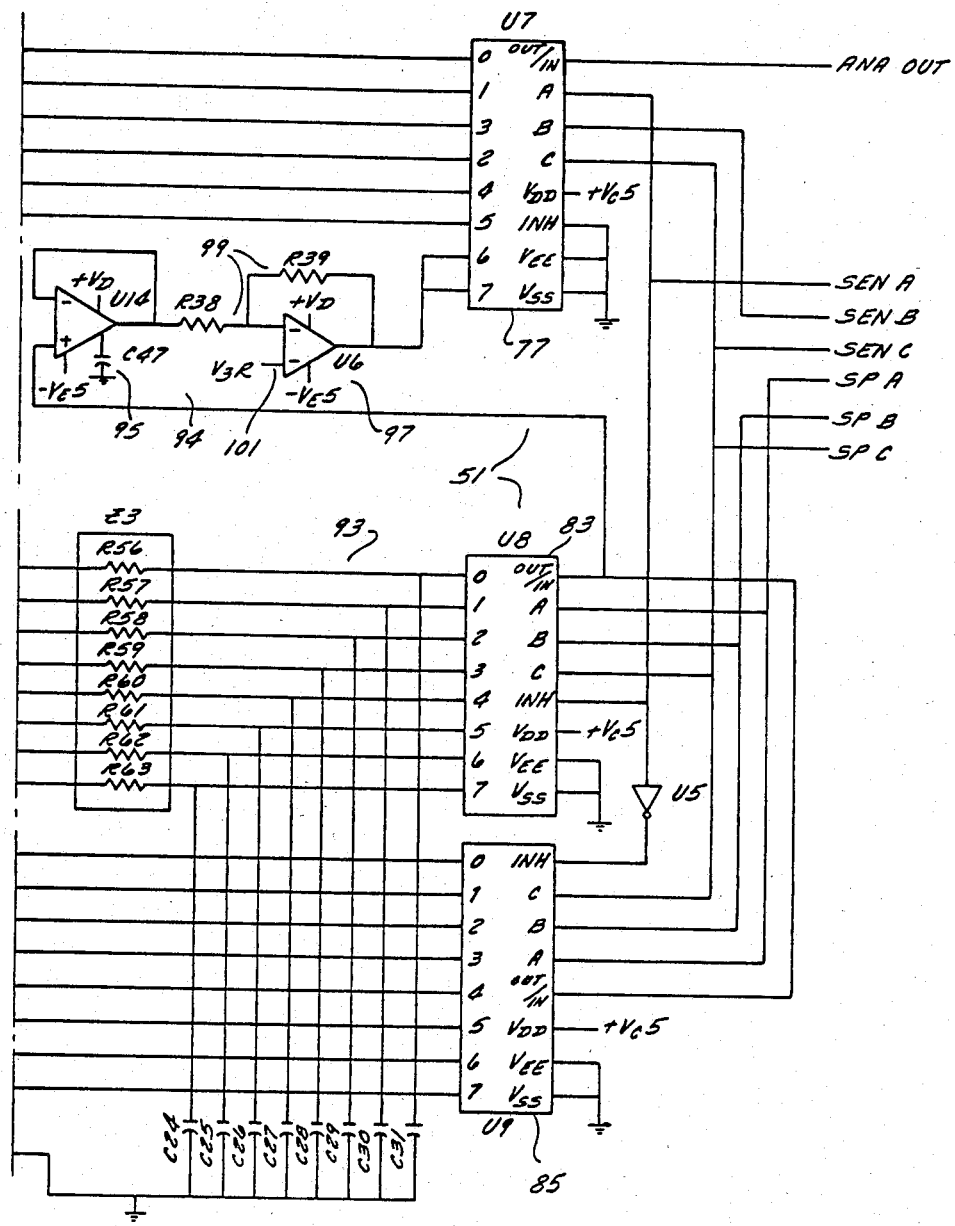

More particularly and referring next to FIGS. 4A and 4B, the first multiplexing means 51 is shown to include a first, master multiplexer 77 adapted to receive analog voltage signals from a plurality of sensors 79 such as temperature and/or humidity sensors. It is preferred that such temperature sensors are of the precision silicon type such as Amperex KTY81B1 having a voltage output range of 1VDC–2VDC over the full range of temperature to be sensed. A temperaure sensor product suitable for use with the controller is available from Johnson Controls, Inc. under catalog nos. A960 and T960. A preferred relative humidity (RH) sensor or transmitter will likewise have a voltage output range of 1VDC–2VDC over the full range of humidity to be sensed. Controller input signals resulting from the activity of these sensors is capable of being resolved to 13 bits. A plurality of reference resistors 80 are provided to linearize the output voltage of thermistor sensors of a type most commonly used. In the alternative, any type of sensor having a voltage output may be coupled to any one of the sensor input terminals so long as the output voltage of the sensor is in the preferred range of 1VDC–2VDC over the full range of the parameter sensed, e.g., from 0% to 100% relative humidity or −40° F. to 216° F. air temperature. Each sensor input line is provided with a resistor-capacitor filter network 81, for filtering electrical noise from the sensor signals as they are directed to the first multiplexer 77.

The controller also includes a second multiplexer 83 and a third multiplexer 85 for receiving, respectively, status or settings from a first group of setpoint potentiometers 87 and from a second group of setpoint potentiometers 89. These potentiometers 87, 89 may be adjusted to select a wide variety of system control parameters as, for example, the zone setpoint temperature desired to be maintained in the space 13 during periods of human occupancy. Other parameters include the set-up temperature to be maintained in the space 13 during periods of non-occupancy and in those seasons when cooling is normally required and the set-back temperature to be maintained in the space 13 during periods of non-occupancy and in those seasons when heating is normally required. It should be appreciated that the set-up temperature will be several degrees higher than the zone setpoint temperature during those seasons when cooling is required to maintain the latter. Similarly, the set-back temperature will be several degrees lower than the zone setpoint temperature during those seasons when heating is required to maintain that nominal space temperature comfortable to the occupants. Other parameters which may be selected by potentiometer settings include the bandwidth, in degrees Fahrenheit, of the cooing and heating deadbands, of the cooling and heating proportional bands, low and high air temperature limits and the like. While the aforementioned setpoint potentiometers 87, 89 may be separately supplied and mounted by the user, a preferred controller 10 will be adapted to include a plurality of plug-in contacts 90 for receiving a subassembly having therein a plurality of individually adjustable potentiometers. The user will thereby find it convenient to make all setpoint adjustments directly at the controller 10.

The controller circuitry is arranged so that the potentiometer signals applied to the input terminals 91 are resolved to nominal 12 bit accuracy. Each input line has a pull-up resistor 92 coupled thereto. These resistors 92 preferably have a value selected to be sufficiently low to maintain the voltage on an open input terminal 91 at approximately the value of the VC5 voltage applied at the terminal 91a and yet sufficiently large to result in negligible loading of the setpoint potentiometers 87, 89. It is preferred that each potentimeters input terminal 91 be coupled to its associated multiplexer 83 or 85 through a resistor-capacitor circuit 93 for filtering electrical noise.

In a preferred embodiment, the voltage applied at the terminal 91a is 5VDC and the second and third multiplexers 83, 85 will be operative to generate serially-transmitted analog signals for all setpoint voltages falling within the range 0-5VDC. Notwithstanding the generation of multiplexed signals in that range, the microcomputer 55 is programmed to recognize only those digital signals representative of potentiometer voltage signals occurring within the narrower first range of 0.5VDC-4.5VDC. Voltage signals falling outside of this range will have predetermined default values substituted therefor by the microcomputer 55.

Signals emanating from the second multiplexer 83 and the third multiplexer 85 are directed to the first multiplexer 77 through an amplifying means 94 having a high input impedance, a unity gain first stage 95 and a second, fractional gain inverting stage 97. Resistors 99 are provided for setting the attenuation value of the inverting stage 97 while the power supply voltage applied to terminal 101 acts as a reference voltage for enabling voltage summations to provide DC level shifting. The output of the amplifying means 94 is directed to the first multiplexer 77 which multiplexes all analog signals to the converter 53.

Figure 5:
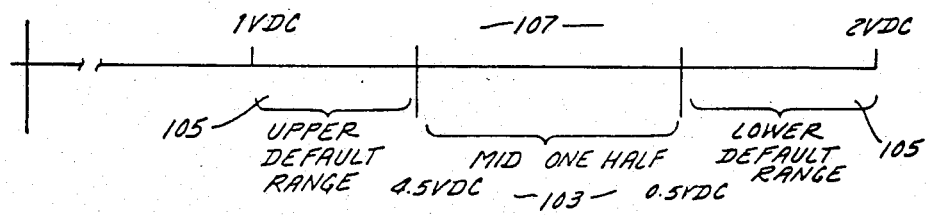
FIG. 5 is a graphic depiction of the relationship of certain voltage input signals to the first multiplexing means to corresponding voltage output signals therefrom.

In a preferred controller 10, voltage summation and DC level shifting and inversion circuitry is incorporated so that the representative analog signals received by the first multiplexer 77 from the second and third multiplexers 83, 85 and directed to the converter 53 will occur in the second range of 2VDC to 1VDC for all values of potentiometer voltage signals occurring in the range of 0.5VDC-4.5VDC as well as for those potentiometer voltage signals occurring in the 0VDC-0.5VDC and 4.5VDC-5.0VDC ranges. As prior stated, voltage signals occurring in these latter two ranges will cause the computer means 55 to substitute predetermined default values. This concept will be better appreciated by reference to FIG. 5 which illustrates the relationship of the potentiometer voltage signals occurring within the first range 103 and the default-triggering voltage signals occurring at the band edges 105 of the first range 103, both of which are re-formed to voltage signals within the second range 107.

Figure 6A:
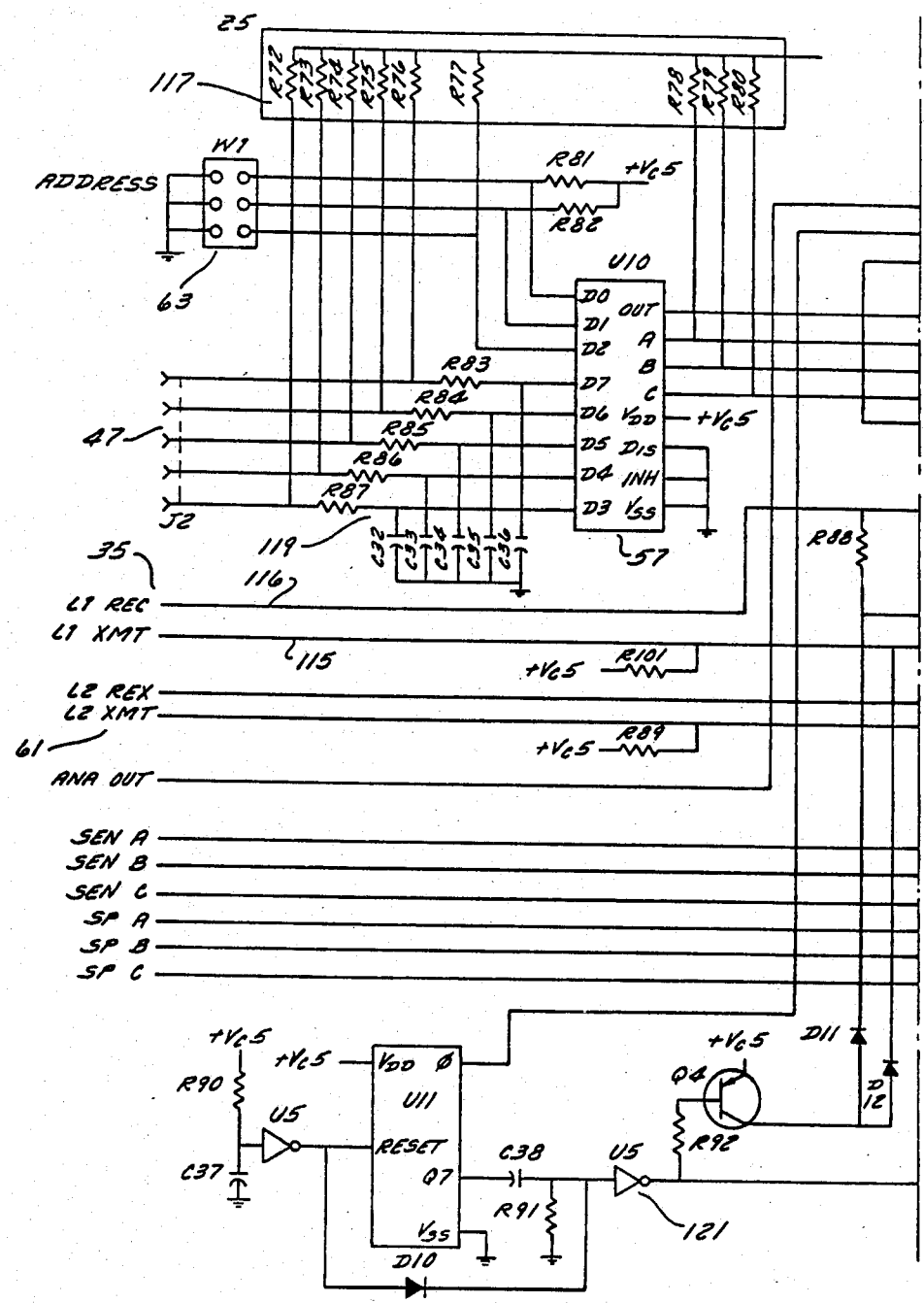
FIGS. 6A and 6B, taken together, comprise the electrical schematic diagram of the converter means, computing means, second multiplexer means and circuitry associated therewith, all forming another portion of the controller of the present invention.
Figure 6B:
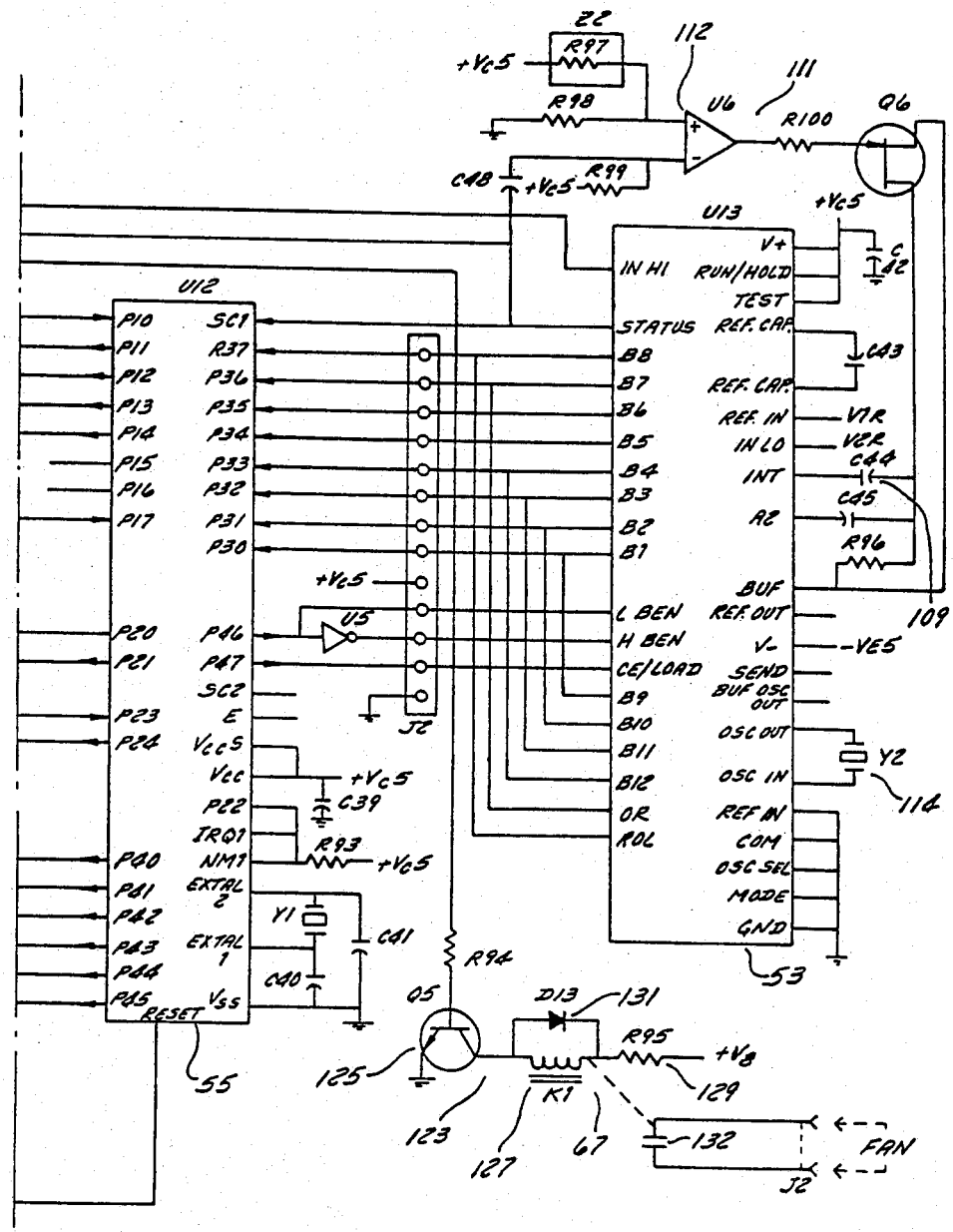

Referring next to FIGS. 6A and 6B, the controller 10 further includes converter means 53 preferably embodied as an analog-to-digital converter for receiving analog status signals occurring within the second voltage range 107, converting these signals to digital data signals representative thereof and directing the data signals to a computing means 55 such as a microcomputer. An integration capacitor 109 is coupled to the converter 53 for permitting the use of dual-slope integration conversion therewithin. The reception of a signal having a value outside the second range 107 of 2VDC-1VDC will represent an overload to the converter 53. It is thereupon necessary to immediately discharge the capacitor 109 to a voltage value which is sufficiently low to permit the capacitor 109 to correctly perform its integration function. Accordingly, an overload recovery circuit 111 is provided which includes a comparator 112 and a field effect transistor 112, the latter being coupled to the capacitor 109. Upon the conclusion of each integration period, the transistor 112 is gated to a conducting state for approximately five milliseconds for causing the rapid discharge of the capacitor 109. The converter 53 is clocked by a crystal 114 having a frequency selected to maximize the rejection of spurious 60 Hz electrical noise.

The microcomputer 55 stores data signals, performs algorithmic computations with respect thereto and generates output signals which are directed to the transmission line 115 comprising a portion of the level 1 bus 35. These output signals may be of a first type for commanding a load device 31 to execute a particular function. For example, a load device 31 comprising a rotary actuator may be commanded to incrementally rotate its output shaft, thereby further opening or closing an air damper 25. In the alternative, the output signals may be of a second, interrogating type whereby a load device 31 is caused to transmit certain information back to the controller 10 along the reception line 116 which is part of the level 1 bus 35. An example of a load device response resulting from the reception of an interrogating command would be the transmission of a binary coded message which represents the actual angular position of an actuator shaft. Yet a third type of output signal may be generated by the controller for resetting all load devices 31 to a known, predetermined state.

In a preferred embodiment and as explained above, the controller 10 is arranged for receiving a plurality of analog voltage signals, preferably six in number, at a first group of input terminals 43 which are adapted to be wired to sensors. Additionally, the controller 10 is adapted to receive a plurality of second analog voltage signals, preferably sixteen in number, at a second group of input terminals 91 adapted to be wired to groups 87, 89 of potentiometers. The microcomputer 55 is programmed to cycle at approximately a one-second time period and during each cycle, the controller 10 accepts and stores digital data signals which are representative of the analog voltage signals of all six sensors 79 and of all binary input signals received at the third group of input terminals as described below. Digital data signals representative of the analog voltage signals of two potentiometers are also stored during each cycle. Data signals representative of the settings of other potentiometers are also sequentially accepted and stored, two such signals for each consecutive cycle and therefore, upon the occurrence of eight consecutive cycles, the microcomputer 55 will have sequentially accepted and stored one set of data signals representative of the analog voltage signals of each of all potentiometer groups 87, 89, eight sets of data signals representative of the binary input signals and eight sets of data signals, each of the latter set being representative of the voltage signals of all sensors 79.

The third group of terminals 47 for receiving binary input signals is coupled to a second multiplexing means 57 for generation of serial analog signals to be directed to the converter 53. An address selection means 63 is connected to the second multiplexing means 57 and is preferably embodied as a plurality of slide action switches, three in number, for permitting the selection of any one of eight possible addresses to which the controller 10 will be responsive if a message so addressed is received thereat along the level 2 bus 61. Pull-up resistors 117 are coupled to the input terminals 47 for permitting these terminals to be activated by either the closure of an external switch contact or by a digital logic "0" signal. Filtering of unwanted electrical noise is accomplished by the inclusion of a resistor-capacitor network 119 coupled to each input terminal.

Since the proper performance of the microcomputer 55 may be impaired by the presence of transient voltages applied to or induced within its circuit nodes, it is desirable to provide means by which the microcomputer 55 may be periodically reset. Reset is also preferred for bringing the microcomputer 55 to a predetermined state at that time when power is initially applied to the controller 10. Accordingly, the controller 10 also includes reset means 121 for periodically generating a reset signal and directing such signal to the microcomputer 55. The microcomputer 55 of a preferred controller 10 will be programmed to perform a review of the integrity of the data stored therewithin immediately subsequent to the receipt of the reset signal.

More specifically, the receipt of an internal reset signal at the microcomputer 55 will initiate a start-up routine which includes the steps of self-checking for proper function, accepting and storing digital signals representative of the binary state of the input signals received at the third group of terminals 47 and of those signals being generated by the address selection means 63. The self-checking step includes a test of random access memory (RAM) to verify the accurancy of all data, both incoming to the microcomputer 55 and calculated therewithin. Subsequent steps include accepting and storing digital signals representative of the values of a plurality of sensor and potentiometer analog voltages, switching the level 1 bus 35 to a logic "0" condition for a predetermined period of time and switching the level 1 bus 35 to a logic "1" condition for a predetermined period of time. In a preferred embodiment, these time periods will be approximately one second each and will result in a resetting of the load devices 31 and a verification of the operation of the transmit and receive functions. Thereafter, the microcomputer 55 transmits a first set of digital output signals comprising a plurality of polling or interrogating messages, each one of which is unique to each of all possible addresses of the remote load devices 31 which may be coupled to the controller by the level 1 bus 35. The microcomputer 55 then receives and stores the address of each responsive load device 31 and thereafter transmits digital output signals only to those load devices 31. Additionally, the addresses of non-responsive devices are periodically polled and if an answering response is generated, digitally-coded addresses of responding devices are likewise stored.

The controller 10 also includes an optional relay circuit 123 for selectively actuating an electromagnetic relay 67. The circuit 123 includes a transistor 125 for energizing the relay coil 127, a current-limiting resistor 129 and a diode 131 for protecting the transistor 125 from voltage spikes which may occur when the coil 127 is de-energized. The relay contacts 132 may be used for operating an external fan, for sounding an audible alarm or the like.

Figure 7:
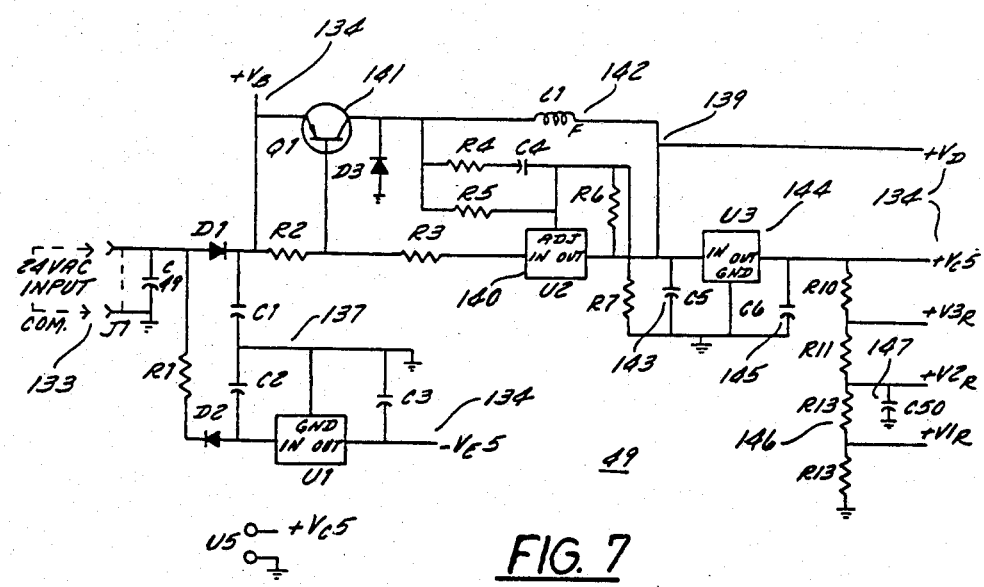
FIG. 7 is an electrical schematic diagram of the power supply portion of the inventive controller.

Referring next to FIG. 7, the power supply 49 is shown to include terminals 133 for receiving an input voltage, preferably 24 VAC, and a plurality of output terminals 134 for powering various portions of the controller 10. The power supply 49 includes a half-wave, negative regulated supply section 137 and a regulated, switching positive supply section 139. A first regulator 140 maintains a voltage at its output terminal which is nominally 8 VDC in the preferred embodiment. The illustrated circuitry functions to switch the transistor 141 to a conducting state whenever the output voltage of the regulator 140 falls below the predetermined regulated value. The regulator 140 is thereupon partially bypassed by a current flowing through the inductor 142 to the capacitor 143. If the voltage at the capacitor 143 exceeds the predetermined regulation value, the transistor 141 is switched to a nonconducting state. The output of the first regulator 140 is coupled to the input of a second regulator 144 for providing a regulated output voltage at nominally 5 VDC. A capacitor 145 is coupled to the output terminal thereof for providing transient stability, a plurality of resistors 146 define a voltage divider network for providing a plurality of reference voltages while a capacitor 147 provides noise filtering.

Figure 8:
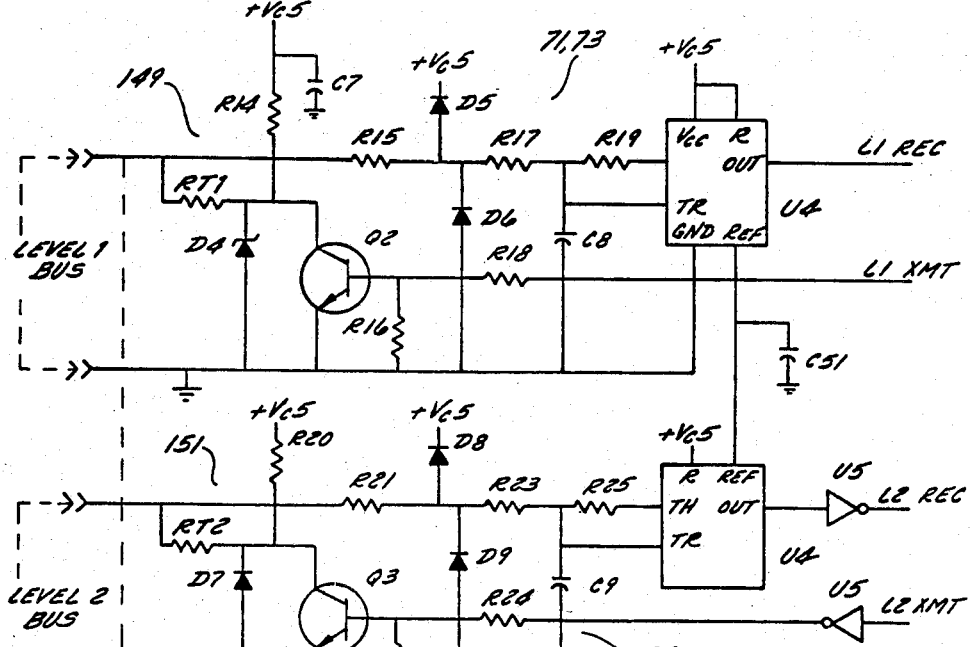
FIG. 8 is an electrical schematic diagram of the buffer interfacing circuits of the controller.

Referring next to FIG. 8, there is shown a first interface circuit 149 and a second interface circuit 151 for rejecting several types of spurious electrical noise which may interfere with communications. These interface circuits 149, 151 permit the microcomputer 55 to transmit and receive signals on both the level 1 bus 35 and the level 2 bus 61. Interfacing between the microcomputer 55 and the buses 35, 61 is as shown in FIG. 8 taken in conjunction with FIGS. 6A and 6B.

Figure 9A:
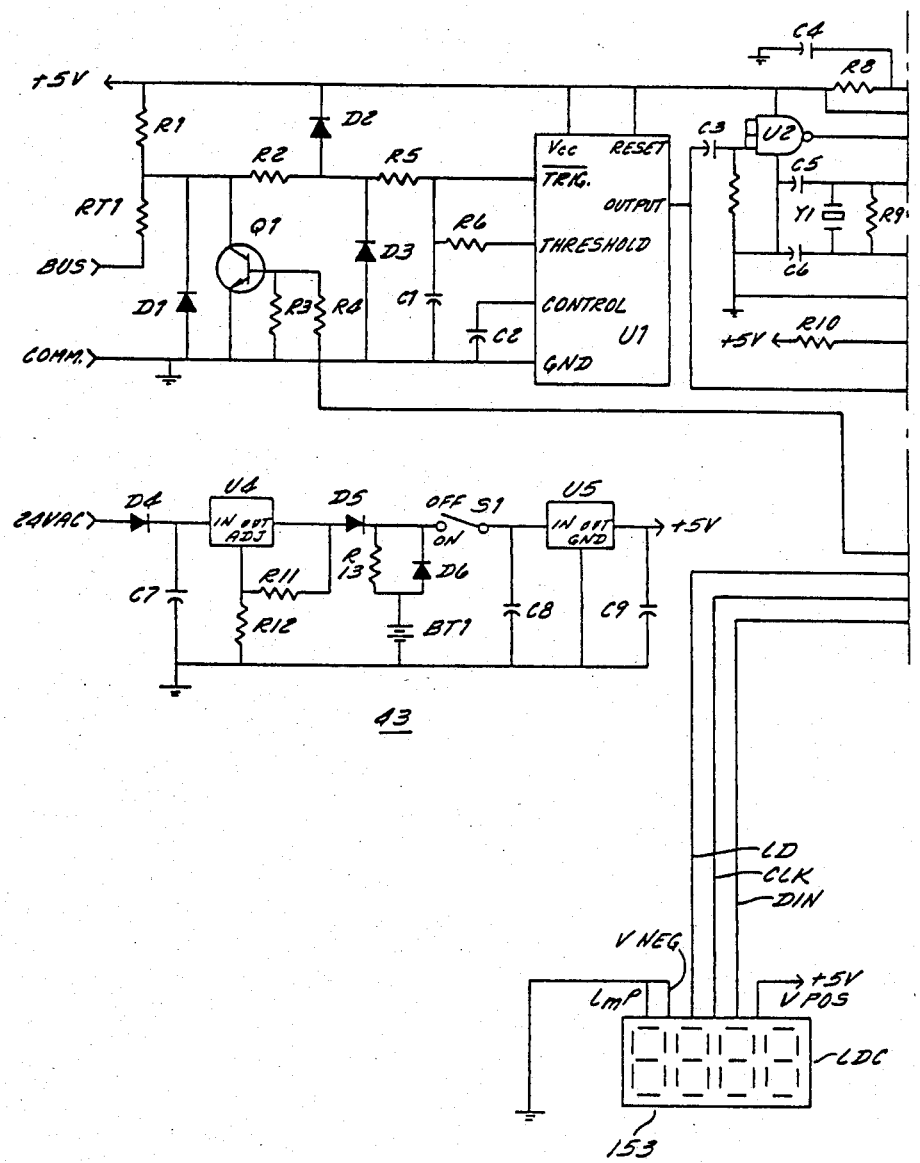
FIGS. 9A and 9B, taken together, comprise the electrical schematic diagram for a service module, a type of load device useful with the controller of the present invention.
Figure 9B:
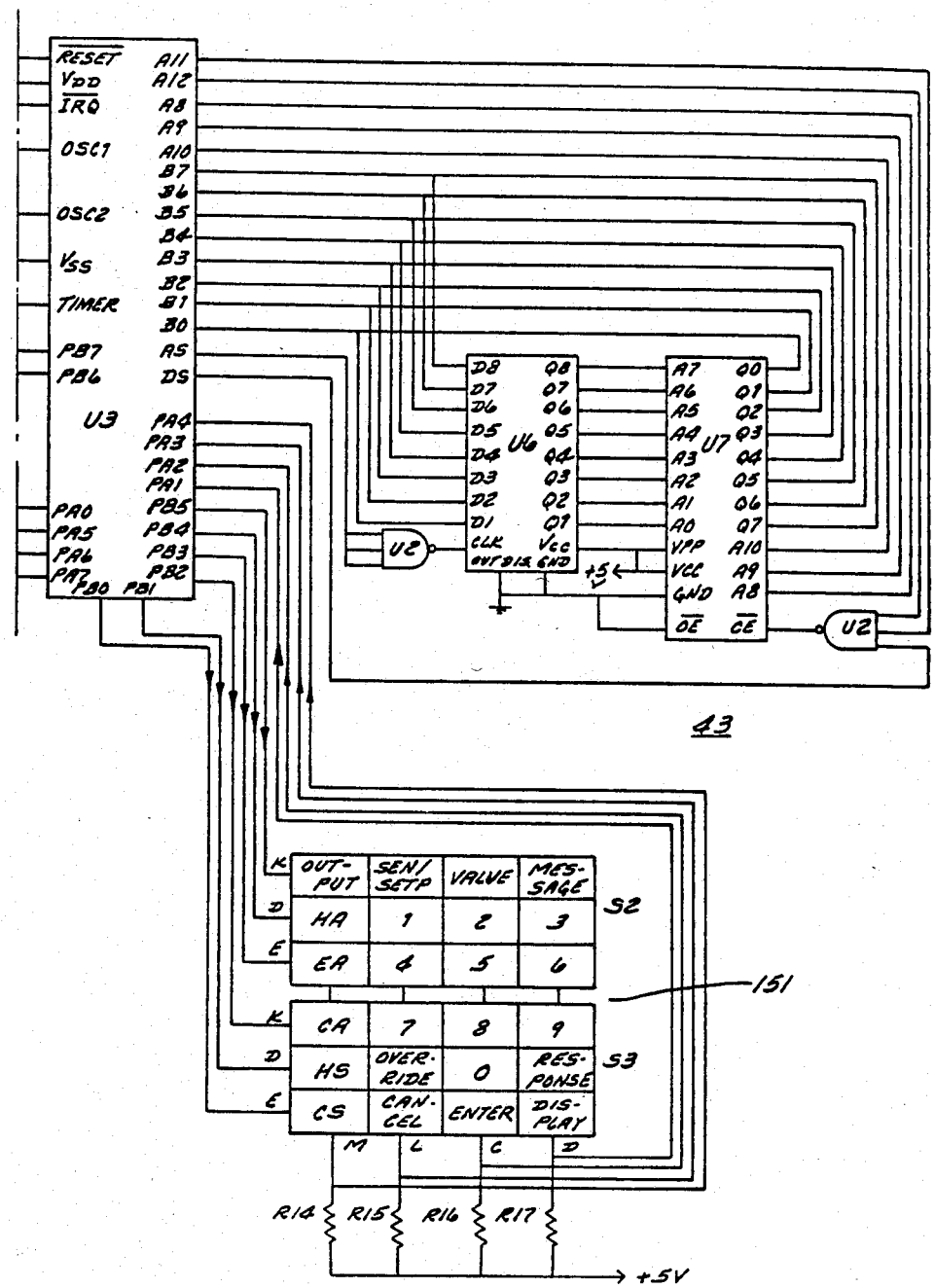

Referring to FIGS. 2, 9A and 9B, one type of load device which is useful with the present invention includes a service module 43 for providing system setup and troubleshooting functions. A preferred service module 43 is constructed and arranged to operate in either a command, an override or a monitor mode. When used in the command mode, the level 1 bus 35 is disconnected from the interface circuit 149 of FIG. 8, the service module 43 is connected to the level 1 bus 35 and may thereupon be utilized to generate commands to the load device 31. For example, depression of a predetermined combination of buttons 151 disposed upon the service module 43 will cause the generation of a command signal requesting a microcomputer-based temperature sensor (not shown) to transmit a digital signal representative of the sensed parameter. The digitized signal from the responding sensor is displayed upon the module luminary 153, preferably in engineering units, e.g., degrees Fahrenheit. If the service module 43 is used for generating override commands during those times when the level 1 bus 35 is connected to the controller 10, a preferred module 43 is capable of generating such commands as, for example, to override the controller 10 and bring a rotary actuator shaft to a new position. It is apparent then, that the service module 43 is capable not only of detecting and displaying data stored within the controller 10 but is also capable of generating command signals for positioning load devices 31, either singly or in plural.

When used as a monitoring device, the service module 43 receives all digitally-coded information being transmitted on the level 1 bus 35, irrespective of whether such transmission is by the controller 10 or by a responding load device 31. Depression of a predetermined sequence of module buttons 151 will permit the module 43 to receive ad display any message appearing on the bus 35.

From the foregoing description, it will be appreciated that the user may employ the controller 10 in conjunction with a service module 43 to control a condition in a zone as, for example, the zone temperature or humidity. Control in this manner may be setup, troubleshooting or other purposes. A method for controlling a zone condition in this manner would include the steps of providing a controller 10 coupled to a plurality of load devices 31 by a communication bus 35, providing a service module 43 coupled to the bus 35, generating a controller-originated signal for commanding a load device 31 to a first position, receiving a module-originated override signal within the controller 10 and generating a controller-originated override signal for commanding the load device 31 to a second position.

Figure 10:
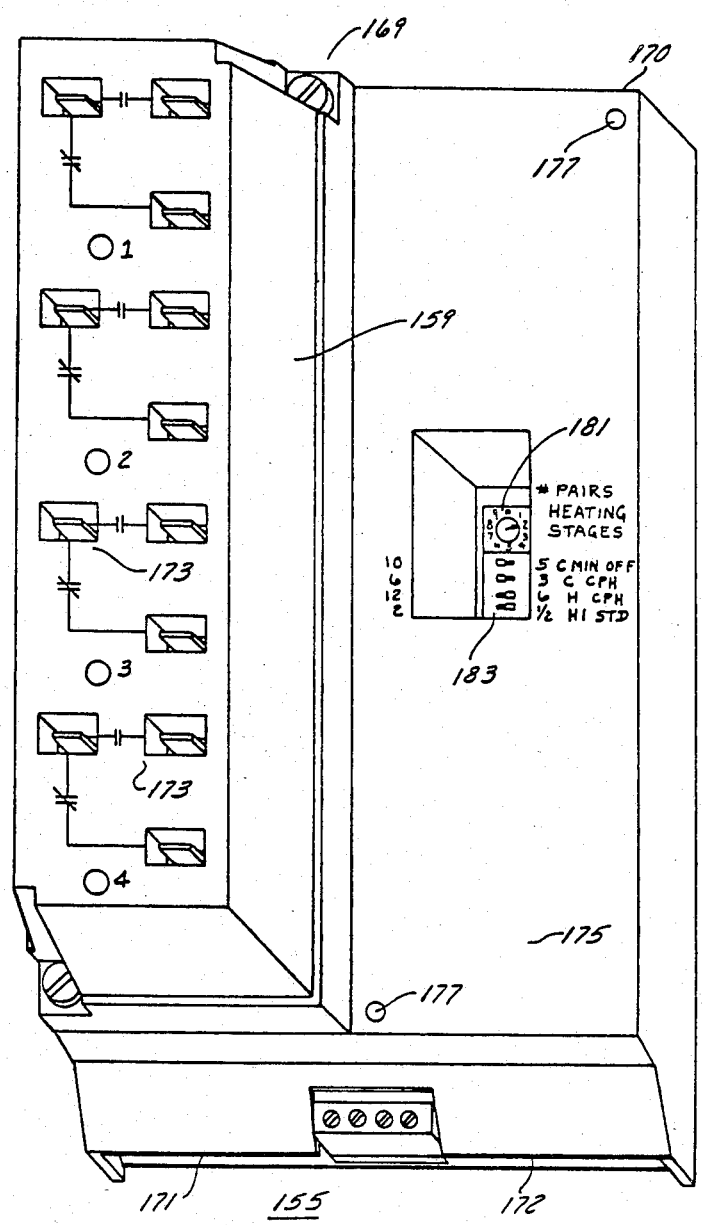
FIG. 10 is a front elevation view of a sequence panel, another type of load device useful with the controller.
Figure 11A:
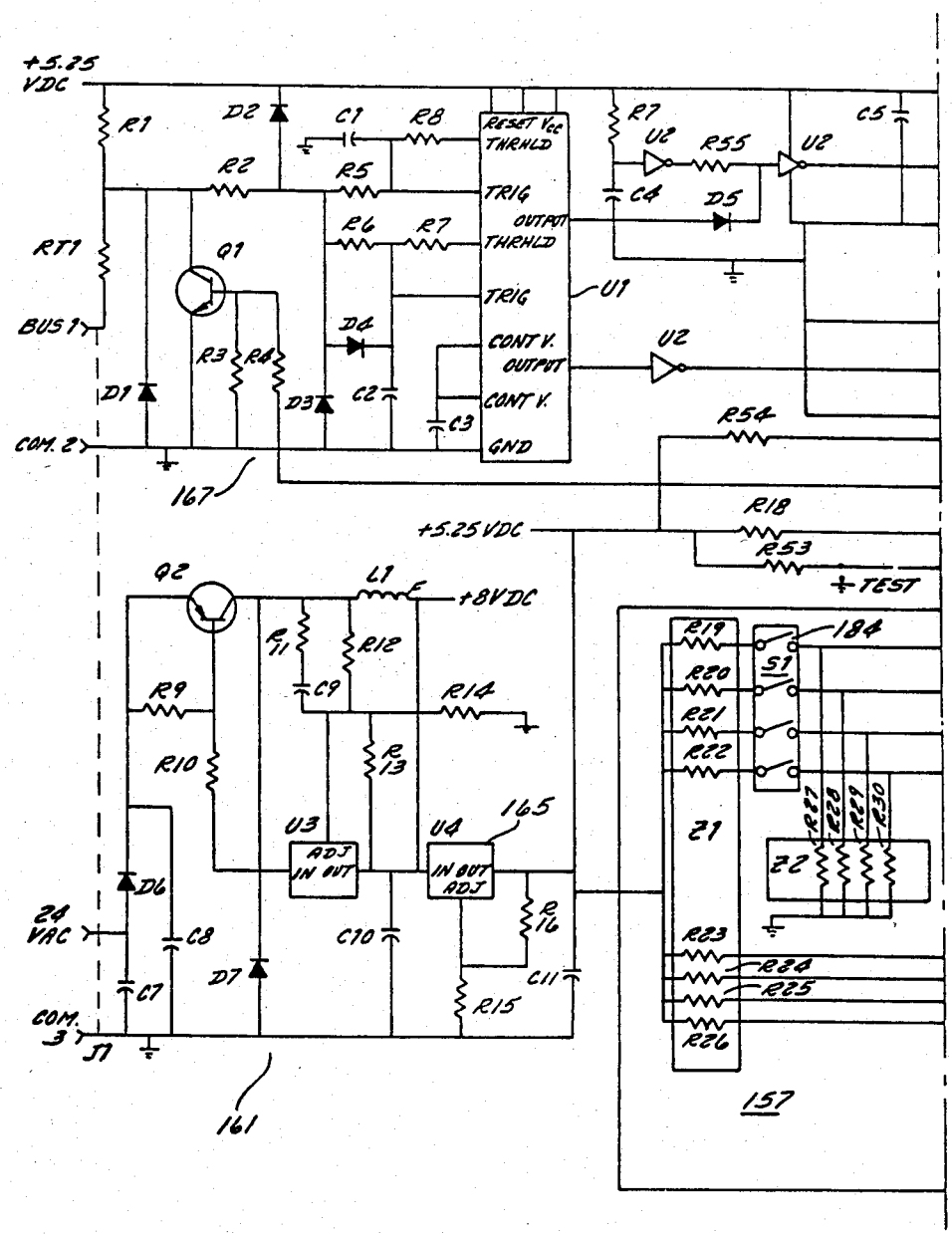
FIGS. 11A and 11B, taken together, comprise the electrical schematic diagram of the chassis of the sequence panel of FIG. 10.
Figure 11B:
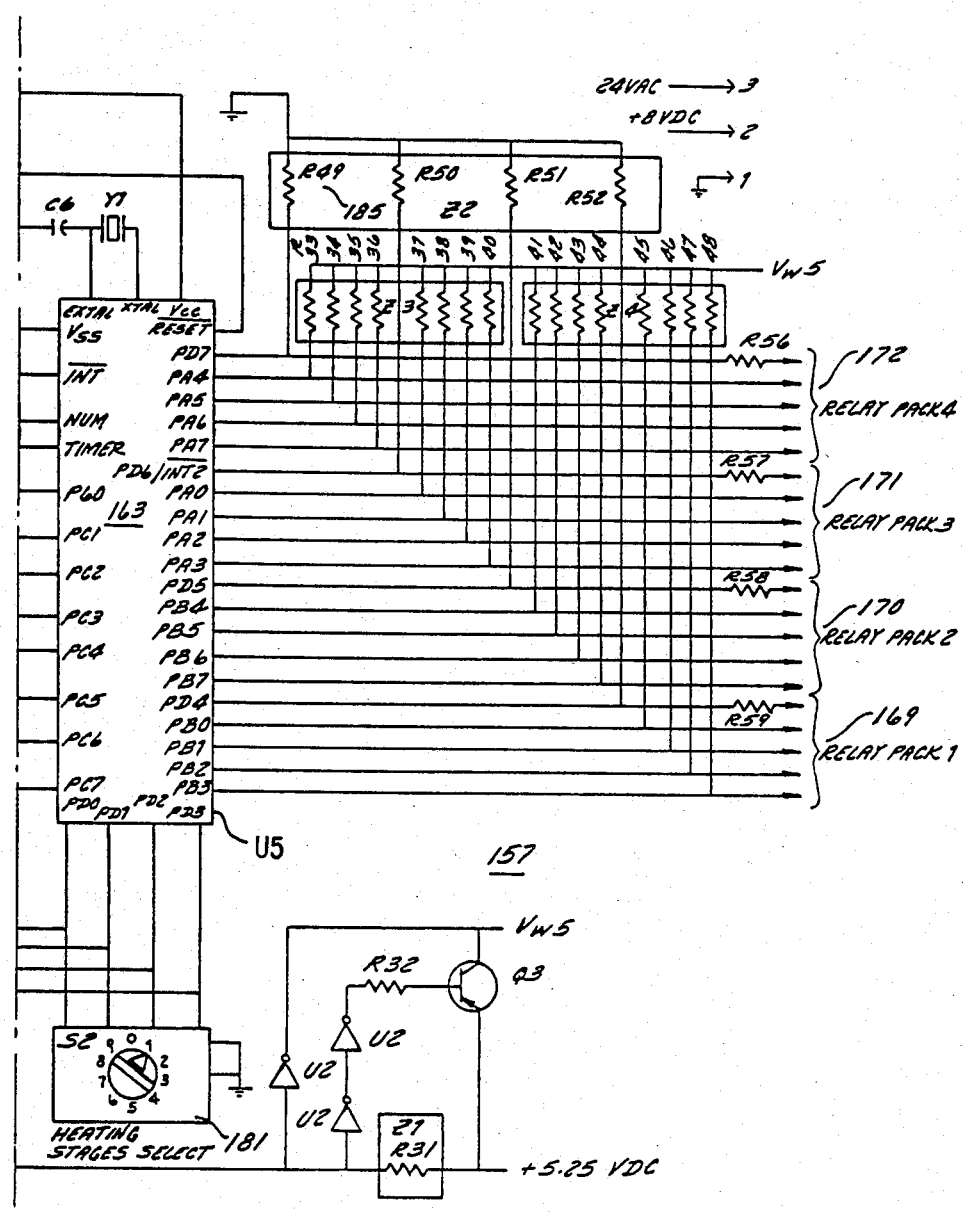

Yet another type of load device useful with the controller 10 of the present invention is shown in FIGS. 1, 10, 11A and 11B to include a sequence panel 155 for selectively controlling heat transfer stages such as heating stages 27, cooling stages 29 or a combination thereof. A preferred panel 155 includes a sequencer chassis 157 and one or more relay packs 159, the latter for controllably actuating the stages 27, 29. Referring particularly to FIGS. 11A and 11B, the chassis 157 is shown to include a regulated, switching positive supply section 161 for providing power to the chassis microprocessor 163. The section 161 is closely similar to the section 139 shown in FIG. 7 but includes an adjustable regulator 165 in place of the fixed regulator 144 shown in the latter FIGURE. An interface circuit 167 facilitates substantially noise-free communication between the level 1 bus 35 and the microcomputer 163 to which it is coupled. Referring additionally to FIG. 10, a first group of terminals 169 is provided for facilitating the electrical connection of a first electromagnetic interface device embodied as a relay pack 159. Additional second, third and fourth groups of relay pack terminals, 170, 171, and 172 respectively, permit the connection of yet other relay packs (not shown) if such are required for the application. Each relay pack 159 includes a known plurality of electromagnetic relays, preferably four, each relay having its contacts made available at external spade terminals 173 and internally connected as shown in FIG. 10. It is convenient to construct the panel 155 to include a housing 175 having mounting holes 177 adapted to receive one or two relay packs 159 atop the housing 175. Additional relay packs 159 may be wall mounted adjacent the housing. Connection of the relay packs 159 to the groups of terminals 169-172 is by multiconductor wire assemblies and edge mounted terminal strips (not shown) located at the upper end and lower end of the housing 175. A plurality of screw terminals 179 is provided for connection of 24 VAC, level 1 bus 35 and ground connections.

The sequence panel 155 includes a binary coded decade switch 181 for selecting the number of system heating stages to be controlled by one or more relay packs 159. The chassis circuitry is configured such that the number selected at the switch 181 is equal to one-half the number of heating stages in the system to be controlled. Additionally, the panel microcomputer 163 may be programmed for providing unalterable, predetermined system timing constraints. For example, the microcomputer 163 may be programmed to provide a minimum time over which the cooling stages will be maintained in a de-energized state, once de-energization occurs. Similarly, minimum time periods may be programmed for providing a maximum number of cooling cycles per hour, of heating cycles per hour, for energizing any two consecutive heating stages or for maintaining a heating or cooling stage in a de-energized state.

However, in a preferred embodiment, the panel 155 is provided with a plurality of switches 184 whereby the user may select one of two time constraints which have been predetermined by the panel designer.

Each group of relay pack terminals 169-172 is coupled to a separate resistor 185, the purpose of which is to provide a signal to the microcomputer 163 whenever a relay pack 159 is connected to a particular terminal group. The microcomputer 163 is programmed to read the number of system heating stages as selected by the switch 181, read the number of relay packs 159 connected to the terminal groups 169-172, each pack 159 being assumed by the program to include four relays, subtract the number of heating stages from the total number of relays available and control the remaining relays as being connected to cooling stages.

Figure 12:
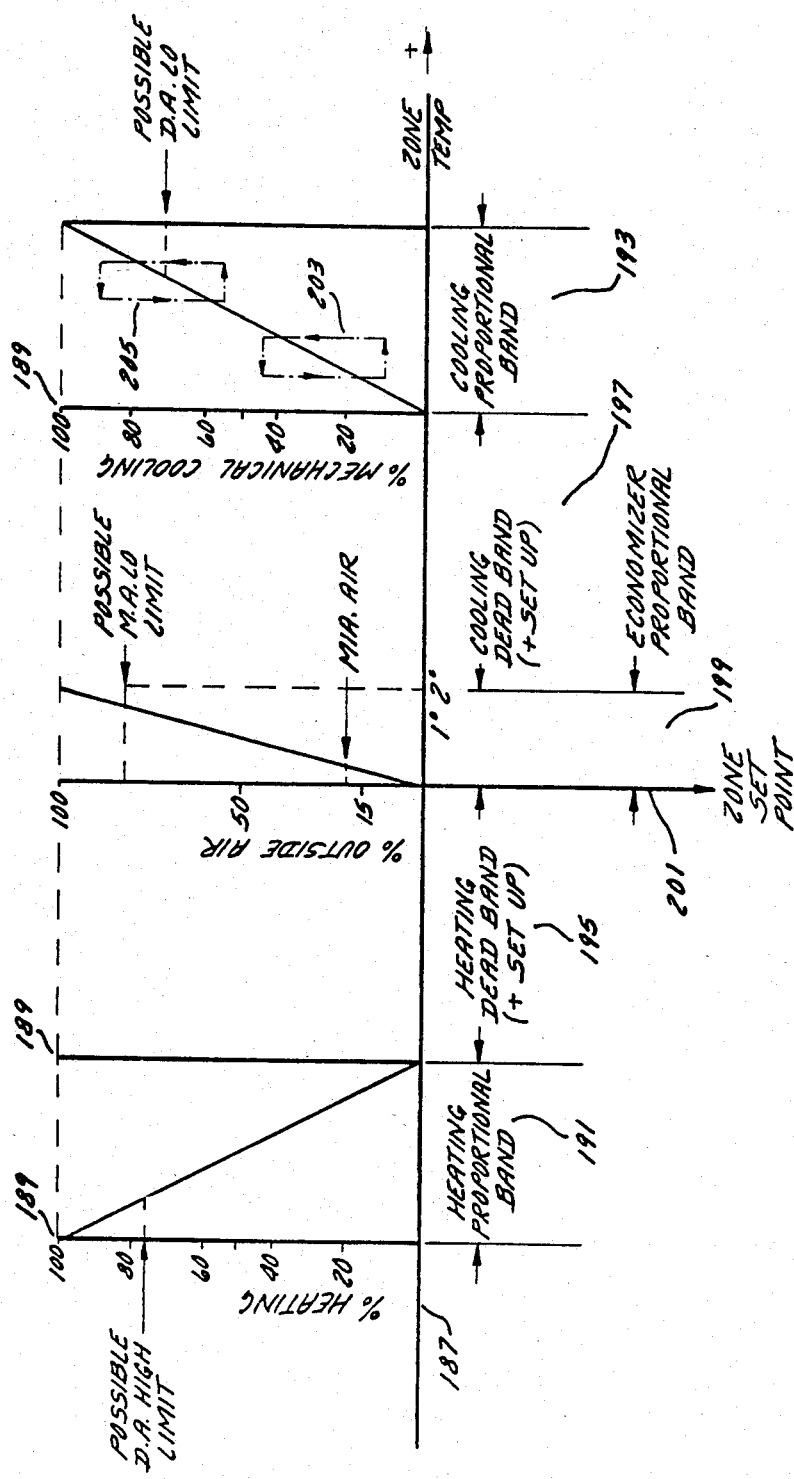
FIG. 12 is a graphical representation depicting certain operating aspects of the controller.

Referring next to FIG. 12, there is shown a zone temperature axis 187 upon which has been superimposed certain vertical axes 189 to define, for example, the width in degrees of the heating and cooling proportional bands 191 and 193, respectively, heating and cooling dead bands 195 and 197, respectively, an economizer proportional band 199 and the set point temperature 201 desired to be maintained within the zone or space 13. A feature of the zone controller 10 is that its microcomputer 55 may be programmed to distribute the actuation of those cooling stages coupled to a sequence panel 155 in virtually any manner over the temperature degree width of the cooling proportional band 193, notwithstanding the fact that the band 193 may have a variable width, within limits, as selected by the controller user. As an exemplary illustration of this feature, it is assumed that the system controlled includes two cooling stages, the first of which has an operating hysteresis loop 203 and the second of which has an operating hysteresis loop 205, with the spacing of the loops 203, 205 being distributed, in this example, evenly over the width of the proportional band 193. While not illustrated, it should be appreciated that a preferred controller 10 may likewise be programmed to distribute, evenly or unevenly, the activity of the heating stages over the width of the heating proportional band 191.

It is preferable that the program embodied in the panel microcomputer 163 be configured to recognize separate addresses for the heating function and for the cooling function. Optionally, the program may also be configured to recognize a third address used to control selected electromagnetic relays (not shown) which are under no time delay or other constraints. For example, a relay contact may be used to energize and de-energize a fan in accordance with a suitable command received at the third address.

When preparing to operate the controller 10 of the present invention and if a sequence panel 155 will be used in conjunction therewith, the panel switches 181 and 184 are set in accordance with the configuration of the particular air handling unit(s) 11 being controlled. If load devices 31 embodied as actuators are used for analog positioning control of valves and/or dampers 25, the address switches of each are appropriately set in accordance with the particular function being controlled by it, i.e., intake air, exhaust air or air mixing. The actuator is then caused to rotate its output shaft to the extremes of its travel, the 0% and 100% travel positions, and the mechanical linkages between the actuator and the device controlled, an exemplary damper 25, are then adjusted.

The program embodied in the controller microcomputer 55 is preferably configured such that the addresses of each of all actuators will be selected from a first group of addresses, the addresses of each of all sequence panel heating stages will be selected from a second group of addresses and the addresses of each of all sequence panel cooling stages will be selected from a third group of addresses. Similarly, particular sensors and set points will be programmed and assumed to be at predetermined addresses.

Referring to FIGS. 1 and 2 and with the load devices 31 coupled to the level 1 bus 35, the bus 35 and sensors 79 coupled to the controller and the setpoints selected by adjustment of the groups 87, 89 of potentiometers, power is applied to the system and the controller 10 will thereupon function to controllably condition the temperature and/or humidity in a zone.

A method for controlling the condition of a zone includes the steps of providing a zone controller 10 adapted to communicate with a level 1 bus 35 having a plurality of load devices 31 coupled thereto, scanning and storing the output values of a plurality of sensors 79 coupled to the controller 10 and scanning and storing the output values of a plurality of setpoint devices 87, 89 coupled to the controller 10. Following this scanning activity, the controller 10 generates a synchronous reset signal for assuring proper operation of the controller microcomputer program. If the program is operating properly, the microcomputer 55 will anticipate and accept this reset signal and, upon so doing, will re-scan all values and parameters in memory such as those of sensors 79, set points and addresses. The controller 10 is programmed to compare the values and parameters existing prior to reset with those existing after reset. If the compared values and parameters are identical before and after reset, the controller 10 thereupon initiates operation of the control algorithm. This initiating step preferably includes the generation of an initializing or polling message to each of every possible address of load devices 31 that may be coupled to the controller 10, irrespective of whether a load device 31 is, in fact, coupled to the controller 10 at that address. Each coupled load device 31 is thereupon caused to generate a responsive identifier signal which includes digital bits delineating the unique address of the responding load device 31. The controller 10 thereupon compares all of the possible addresses of load devices 31 with those addresses of load devices 31 actually coupled thereto and subsequently communicates only with addresses of the latter. Thereafter, the controller 10 performs algorithmic decisional functions relative to the signals received therein, selectively transmitting digital output signals to one or more of a plurality of uniquely, digitally-addressable load devices 31 coupled thereto by a communication bus 35 and periodically receiving digital input signals from one or more of these load devices 31.

During certain phases of operation of the controller 10, it may be desirable to generate a signal for resetting all load devices 31 coupled to the level 1 bus 35. This may occur when, for example, there is an interruption of power at the controller 10 but not at the load devices 31. It may also be desirable to assure that the bus 35 is not inadvertently short-circuited. In these events and prior to the scanning steps delineated above, the controller 10 generates a bus reset signal for a first predetermined time of approximately one second by holding the bus 35 at a logic "0" value. The controller 10 also generates a fault detection signal by switching the bus 35 to a logic "1" state for a second, predetermined time of approximately one second to assure that no external device is causing an inadvertent short circuit upon the bus 35.

In the event that a service module 43 is coupled to the level 1 bus 35, the operator may desire to cause the generation of an override signal or to read the value of a particular sensor 79 or set point value. If the operator wishes to override an output signal from the controller 10, he may sequentially depress certain buttons 151 disposed upon the service module 43 whereupon the digital output signal is intercepted, a command signal is generated and directed to the controller 10 as a request for a new output signal based upon the override value selected by the operator. The controller 10 will thereupon be caused to generate a replacement digital output signal based upon the override value.

The operation of the inventive controller 10 has been described in connection with what is known in the HVAC art as a hot deck, cold deck type of air handling unit 11. However, it will be appreciated by those of ordinary skill in the art that the controller 10 is an apparatus of broad, general purpose application and the controller 10 may be readily adapted for use with variable air volume (VAV) systems. Such systems include, for cooling, a source of air at a temperature a few degrees less than that of the space to be cooled. The temperature of the source air is maintained relatively constant and the space is controllably cooled by varying the volume of air introduced thereto. The only change in the controller 10 which is required to permit its use with VAV systems is a change in the programming of the microcomputer 55.

It is to be appreciated that wherever the terms "microcomputer" or "microprocessor" are used herein, they are intended to be synonymous with a digital computing structure such as an integrated chip, irrespective of whether the memory function is incorporated therewith as an integral part or as a separate memory device coupled to the structure. The following component values have been found useful in the controller of the present invention. Capacitance values are in microfarads unless otherwise specified; resistors are 5% and capacitors are 20% tolerance unless otherwise specified.

| FIGS. 4A, 4B | | | |
|---|---|---|---|
| R26–R31 | 2320, 0.1% | R32–R37 | 100K |
| R38 | 69 8K, 1% | R39 | 10K, 1% |
| R40–R55 | 47K | R56–R71 | 270K |
| C10–C15, C46 | 0.22 | C16–C31 | 0.022 |
| C47 | 0.001 | U5 | CD4069B |
| U6 | LM358 | U7–U9 | CD4051B |
| U14 | LM308 | | |
| FIGS. 6A, 6B | | | |
| R72–R82, R89, R94 | 4.7K | R83–R87 | 470K |
| R88, R93 | 1K | R90, R100 | 1 M |
| R91, R92 | 27K | R95 | 330 |
| R96, R97 | 47K | R98, R99 | 100K |
| R101 | 10K | C32–C36 | 0.022 |
| C37, C39, C92 | 0.22 | C38 | 0.001 |
| C40, C41 | 27 pf | C43 | 10 |
| C44 | 0.15 | C45 | 0.33 |
| C48 | 0.1 | D10–D13 | 1N4148 |
| FIGS. 6A, 6B | | | |
| Q4 | 2N3905 | Q5 | GES5822 |
| Q6 | J201 | U5 | CD4069B |
| U6 | LM358 | U10 | CD4512B |
| U11 | CD4024B | U12 | MC6801-1 |
| U13 | 1CL7109 | Y1 | 4.9152 MHZ |
| Y2 | 3.5795 MHZ | | |
| FIG. 7 | | | |
| D1, D2 | 1N5060 | D3 | 1N4935 |
| C1 | 330/50 V | C2 | 22/50 V |
| C3 | 2.2/50 V | C4 | 0.01 |
| C5 100/16 V | low ESR | C6, C50 | 0.22 |
| C49 | 0.1/200 V | R1 | 680 |
| R2 | 33 | R3 | 220 |
| R4 | 100K | R5 | 1 M |
| R6 | 240 | R7 | 1.3K |
| R10 | 2670, 0.1% | R11 | 90.9, 0.1% |
| R12 | 1060, 0.1% | R13 | 229, 0.1% |
| U1 | 79L05 | U2 | 317L |
| U3 | 7805 | Q1 | 2N6107 |
| L1 | 350 microh. | | |
| FIG. 8 | | | |
| D4 | 1N4736 | D5, D6, D8, D9 | 1N4148 |
| D7 | 1N5060 | RT1, RT2 | 22, +t° |
| R14 | 470 | R15, R21 | 10K |
| R16, R22 | 20K | R17, R23 | 47K |
| R18, R24 | 6.8K | R19, R25 | 330K |
| R20 | 100K | C7 | 0.22 |
| C8, C9 | 0.0033 X7R | C51 | 0.022 |
| U4 | 556 | U5 | CD4069B |
| Q2, Q3 | GES5822 | | |
| FIGS. 9A, 9B | | | |
| R1 | 2K | R2, R7 | 10K |
| R3 | 20K | R4 | 3.3K |
| R5 | 47K | R6 | 470K |
| R8 | 1 M | R9 | 10 M |
| R10, R14–R17 | 4.7K | R11 | 240 |
| R12 | 2.7K | R13 | 1.2K |
| C1 | 0.0033 X7R | C2 | 0.01 |
| C3 | 0.001 X7R | C4, C8 | 0.1 |
| C5, C6 | 22 pf | C7 | 47, 50 V. |
| C9 | 100, 10 V. low leak | RT1 | 10, +t° |
| D1, D4–D6 | 1N5060 | D2, D3 | 1N4148 |
| Q1 | GES5822 | U1 | ICM7555I |
| U2 | CD4023B | U4 | LM317L |
| U5 | LM2931 | U6 | 74C374 |
| U7 | NMC27C16 | LDC1 | PCI183 |
| S2, S3 | 87AB3-201 | U3 | MC146805EZ |
| Y1 | 5 MHz | | |
| FIGS. 11A, 11B | | | |
| R1 | 100K | R2, R18, R27–R30 R53–R55 | 10K |
| R3 | 20K | R4 | 3.3K |
| R5 | 47K | R6–R8, R11 | 470K |
| R9 | 33 | R10 | 100 |
| R12, R17 | 1 M | R13 | 240 |
| R14 | 1.3K | R15 | 768, 1% |
| R16 | 243, 1% | R19–R26, R31–R52 | 4.7K |
| C1 | 0.0033 X7R | C2 | 0.22 |

| | | | |
|---|---|---|---|
| | | -continued | |
| C3, C9 | 0.01 | C4, C5, C11 | 0.10 |
| C6 | 27 pf | C7 | 0.10, 250 V. |
| C8 | 330, 50 V. | C10 | 100, 16 V., low ESR |
| FIGS. 11A, 11B, | | | |
| D1, D6 | 5060 | D7 | 4935 |
| D2-D5 | 1N4148 | RT1 | 22, +t° |
| Q1 | 5822 | Q2 | 2N6107 |
| Q3 | 5823 | U1 | 556 |
| U2 | CD4069 | U3 | 317L |
| U4 | 317T | U5 | MC6805 |
| Y1 | 4.00 MHZ | 52 | Model 230002G by EECO Inc. |

While a single preferred embodiment of the zone temperature controller and of a method for using same have been shown and described, they are not intended to be limited thereby but only by the scope of the appended claims.

The computer program listing for the controller 10 is set forth as follows:

```
   0  1  2  3  4  5  6  7   8  9  A  B  C  D  E  F
  43 4F 50 59 52 49 47 48  54 20 31 39 38 34 20 4A
  4F 48 4E 53 4F 4E 20 43  4F 4E 54 52 4F 4C 53 20
  49 4E 43 2E 20 52 31 30  30 41 2D 32 20 46 52 4F
  4D 20 53 5A 43 36 48 20  20 30 35 2D 32 35 2D 38
  34 20 44 4F 43 55 4D 45  4E 54 45 44 2C 20 44 45
  42 55 47 47 45 44 2C 20  41 4E 44 20 45 58 50 41
  4E 44 45 44 20 42 59 20  54 45 52 52 59 20 48 45
  43 4B 45 4E 42 41 43 48  20 46 52 4F 4D 20 4F 52
  49 47 49 4E 41 4C 20 57  4F 52 4B 20 42 59 20 48
  45 4E 52 59 20 47 4C 45  41 53 4F 4E 2C 20 41 44
  44 20 46 41 4E 20 54 49  4D 45 52 2C 20 41 44 44
  20 41 53 52 44 20 54 4F  20 53 50 4D 4F 56 2C 20
  52 45 4C 41 59 20 4F 56  52 44 2C 54 50 53 45 54
  20 4D 41 43 52 2C 20 4D  41 4B 45 20 41 4C 47 20
  52 55 4E 20 44 55 52 49  4E 47 20 49 4E 49 54 20
  50 45 52 49 4F 44 2C 20  4E 45 57 20 53 45 54 50

0  1  2  3  4  5  6  7   8  9  A  B  C  D  E  F
  54 32 20 57 49 54 48 20  44 49 56 49 53 49 4F 4E
  3D 4B 31 2C 20 53 50 44  46 4D 43 2C 20 43 48 47
  20 4C 31 42 34 20 54 4F  20 4C 31 42 45 4E 44 2C
  20 4D 41 58 52 45 54 3D  34 20 54 45 4D 50 20 46
  4F 52 20 54 45 53 54 49  4E 47 20 57 49 54 48 20
  4D 4F 4E 49 54 4F 52 2C  20 42 4C 4F 20 4C 32 57
  41 49 54 2C 20 41 44 44  20 4D 4F 44 54 59 50 20
  4D 53 47 20 4F 4E 20 4C  31 20 49 4E 49 54 2C 20
  4D 4F 56 45 20 52 2F 43  20 46 52 4F 4D 20 42 55
  46 2B 43 4F 4D 4E 44 53  2B 31 20 54 4F 20 42 55
  46 2B 31 2C 20 41 4C 4C  4F 57 20 4C 31 20 4D 53
  47 20 36 20 26 20 37 20  52 45 51 2C 20 44 45 56
  4F 55 54 20 54 53 54 20  41 54 20 4C 31 52 53 50
  45 20 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
```

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | 87 | 0C | 00 | A3 | 83 | 30 | 00 | B3 | 84 | 50 | 00 | C3 | 85 | 70 | 00 | 91 |
|    | 81 | 83 | 00 | 89 | 82 | A3 | 00 | 8D | 81 | C5 | 00 | D8 | 81 | C5 | 00 | E7 |
|    | 00 | 00 | 00 | 00 | 00 | 00 | 00 | 00 | 00 | 00 | 00 | 00 | 00 | 00 | 00 | 00 |
|    | 00 | 00 | 00 | 00 | 00 | 00 | 00 | 00 | 00 | 00 | 00 | 00 | 00 | 00 | 00 | 00 |
|    | 86 | A3 | 00 | 8D | 38 | 02 | F2 | 52 | 38 | 02 | F2 | 54 | 81 | 02 | F2 | 50 |
|    | 01 | 00 | FF | FF | 00 | 00 | 10 | 10 | 0D | 0E | 11 | 12 | 15 | 16 | FF | FF |
|    | 0F | 13 | 17 | 18 | 19 | 38 | FF | FF | 20 | 21 | 22 | 23 | 24 | 25 | FF | FF |
|    | 8D | 8D | 8F | 8F | 8E | 8E | 00 | 00 | 8D | 8F | 8E | 8D | 8F | 93 | 00 | 00 |
|    | FF | FF | FF | FF | FF | FF | 00 | 00 | 01 | 02 | 04 | 08 | 10 | 20 | 40 | 80 |
|    | 00 | 30 | 10 | 00 | 00 | 00 | 50 | 10 | 00 | 00 | 20 | 60 | 08 | 00 | 80 | 20 |
|    | 60 | 08 | 00 | 80 | 40 | 80 | 10 | 00 | 00 | 80 | C0 | 10 | 00 | 00 | 00 | 50 |
|    | 10 | 02 | 80 | 20 | 70 | 10 | 04 | 00 | 80 | A8 | 20 | 11 | 00 | A0 | 50 | 40 |
|    | 3C | 00 | 1A | 00 | FF | 00 | 00 | A8 | 80 | 20 | 11 | 00 | 80 | 58 | 20 | 11 |
|    | 00 | 58 | 80 | 20 | 16 | 00 | 98 | 80 | 40 | 12 | 00 | 00 | 00 | FF | 00 | 00 |
|    | 96 | 0F | D6 | 06 | 4D | 2A | 63 | D6 | 07 | C4 | 3F | D7 | 07 | C4 | 07 | C1 |
|    | 05 | 2E | 0E | CE | F2 | 88 | 3A | D6 | D8 | DA | E7 | DA | BB | E4 | 00 | 26 |

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | 3B | D6 | 07 | C4 | 07 | 58 | CE | 00 | A3 | 3A | D6 | 06 | 96 | 07 | 8A | 40 |
|    | 97 | 07 | 96 | 06 | 84 | CF | 85 | 40 | 26 | 31 | 4D | 2B | 05 | 43 | 53 | C3 |
|    | 00 | 01 | 8B | 90 | 05 | 05 | DD | 85 | D6 | 07 | C4 | 07 | C1 | 05 | 2E | 4D |
|    | C1 | 04 | 2D | 24 | DC | 85 | 05 | C6 | 32 | 3D | ED | 00 | 96 | 07 | 4C | 8A |
|    | C0 | 97 | 07 | D6 | 98 | 27 | 03 | 7A | 00 | 98 | 3B | 4D | 2A | 05 | CC | EB |
|    | FF | 20 | E7 | CC | EB | 00 | 20 | E2 | DC | 85 | 83 | 14 | 00 | DD | 85 | A3 |
|    | 00 | 2B | 0E | 4D | 26 | 17 | C1 | 20 | 22 | 13 | CC | 00 | 01 | E3 | 00 | 20 |
|    | C9 | 43 | 26 | 09 | C1 | E0 | 23 | 05 | CC | FF | FF | 20 | F0 | DC | 85 | 20 |
|    | B9 | D6 | D3 | 27 | 12 | 96 | 08 | DC | 0D | C3 | 01 | 55 | DD | 0B | 86 | 0C |
|    | 97 | 08 | 86 | 80 | 97 | 80 | 3B | 96 | 08 | DC | 0D | C3 | 64 | 00 | DD | 0B |
|    | 3B | 86 | 80 | 97 | 98 | 86 | 04 | 97 | 08 | CC | FF | 00 | DD | E2 | CC | 00 |
|    | EC | DD | E4 | 96 | 11 | 96 | 12 | CC | 06 | 1A | DD | 10 | 7E | F5 | EC | 7F |
|    | 00 | 02 | 4F | 97 | 08 | 86 | 3E | 97 | 00 | 86 | 12 | 97 | 01 | 96 | 0F | 96 |
|    | 06 | 86 | 40 | 97 | 0F | 86 | FF | 97 | 05 | 86 | C7 | 9A | 07 | 97 | 07 | 39 |
|    | 86 | 01 | 97 | 08 | 20 | FE | 8E | 00 | FF | 96 | 14 | 2B | 54 | 7F | 00 | 94 |
|    | CE | 00 | FF | A6 | 00 | 63 | 00 | 43 | A1 | 00 | 26 | E4 | 63 | 00 | 8C | 00 |

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | 94 | 27 | 02 | 6F | 00 | 09 | 8C | 00 | 7F | 26 | E8 | 86 | C0 | 97 | 14 | 86 |
|    | FF | 97 | 97 | 8D | AA | 86 | C0 | 97 | 07 | 0E | 5F | BD | F5 | 78 | 0F | BD |
|    | F4 | D6 | 0E | C6 | 04 | BD | F5 | 78 | 96 | 07 | 84 | 38 | 81 | 38 | 27 | 0F |
|    | 81 | 28 | 2D | E6 | 27 | 05 | 4F | 97 | 08 | 20 | DF | 86 | 01 | 20 | F8 | 20 |
|    | FE | DC | 09 | C3 | 00 | 0F | DD | 0B | 96 | 97 | 2A | 27 | 81 | FF | 26 | A0 |
|    | 7F | 00 | 97 | BD | F3 | BF | BD | F3 | A1 | 7A | 00 | 98 | CE | FF | FF | 0E |
|    | 96 | 02 | 2B | F8 | 09 | 26 | F9 | 86 | C0 | 97 | 87 | 3F | 96 | 87 | 2B | FC |
|    | 7E | F5 | E3 | BD | F3 | C2 | CE | 00 | F2 | DF | F8 | CE | 00 | 80 | C6 | 1E |
|    | 3C | DE | F8 | A6 | 01 | 97 | F7 | 6F | 01 | 38 | A6 | 00 | 3C | DE | F8 | 37 |
|    | BD | FC | CD | 33 | 38 | 08 | 8C | 00 | F3 | 27 | 03 | 5A | 26 | EC | 3C | DE |
|    | F8 | E6 | 01 | 08 | DF | F8 | 38 | D1 | F7 | 26 | 22 | 8C | 00 | F3 | 26 | CE |
|    | BD | F3 | A1 | CE | F4 | BC | 3C | 3C | 36 | BD | F2 | E7 | 0E | 96 | 87 | 8A |
|    | A0 | 84 | F8 | 97 | 87 | 3F | 96 | 87 | 2B | FC | 7E | F6 | 65 | 86 | 04 | 9A |
|    | 94 | 97 | 94 | 7E | F3 | F0 | D6 | 07 | 54 | 54 | 54 | 5A | C4 | 07 | 17 | CE |
|    | F2 | 88 | 3A | 58 | D7 | DE | 58 | 1B | 97 | DF | DC | D9 | DA | E9 | E4 | 00 |
|    | D7 | DD | 9A | E8 | A4 | 00 | 26 | 04 | DC | AF | 8D | 0E | D6 | DD | 26 | 4D |

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | DC | DE | 8B | 10 | CB | 28 | DD | DE | DC | B1 | 05 | DD | 85 | 81 | C8 | 24 |
|    | 4B | 81 | C0 | 24 | 3E | 81 | 38 | 25 | 47 | 83 | 40 | 00 | 25 | 3A | DD | 85 |
|    | C3 | 00 | 08 | 2A | 02 | DD | 85 | CE | 00 | B3 | D6 | DE | 3A | 3C | CE | F2 |
|    | 90 | D6 | DF | 3A | E6 | 02 | D7 | E0 | 5C | 27 | 13 | DC | 85 | 7D | 00 | E0 |
|    | 27 | 06 | 04 | 79 | 00 | E0 | 24 | FA | E3 | 03 | 38 | ED | 00 | 39 | C6 | 64 |
|    | 3D | 20 | F7 | CC | 80 | 00 | 20 | CD | 4F | 5F | 20 | C9 | C6 | 01 | 20 | 01 |
|    | 5F | DB | DF | CE | F2 | 90 | 3A | 8C | F2 | DC | 26 | 06 | 96 | 93 | 8A | 20 |
|    | 97 | 93 | A6 | 00 | 16 | 04 | 20 | A6 | 96 | 07 | 84 | 07 | 11 | 26 | F9 | 39 |
|    | 86 | 80 | 9A | 94 | 97 | 94 | 0F | 20 | FE | 5F | 8D | EC | 0F | BD | F4 | D6 |
|    | 0E | 96 | 97 | 27 | 03 | 4A | 2B | E8 | 97 | 97 | D6 | D7 | CA | C0 | D7 | D7 |
|    | 3F | CE | 00 | 89 | A6 | 00 | AA | 01 | AA | 02 | 27 | 1B | 96 | 8C | 20 | 02 |
|    | 8B | 08 | 84 | 18 | 81 | 18 | 26 | 01 | 4F | 97 | 8C | 16 | 54 | 54 | 54 | CE |
|    | 00 | 89 | 3A | E6 | 00 | 27 | E9 | 96 | DC | 27 | 0A | 4A | 97 | DC | 26 | 05 |
|    | 5F | DD | D8 | DD | DA | 96 | EB | 27 | 0A | 4A | 97 | EB | 26 | 05 | 5F | DD |
|    | E7 | DD | E9 | C6 | 04 | BD | F5 | 78 | 8D | 02 | 20 | 3E | 96 | 02 | 84 | F1 |
|    | 97 | 02 | C6 | 08 | 7F | 00 | E1 | 96 | 02 | 44 | 76 | 00 | E1 | 5A | 27 | 08 |

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | 96 | 02 | 8B | 02 | 97 | 02 | 20 | EF | D6 | E1 | C4 | 07 | CB | 38 | 96 | E6 |
|    | 84 | 80 | 1B | 97 | E6 | D6 | E1 | 53 | C4 | F8 | D7 | E1 | 96 | DB | 9A | EA |
|    | 16 | 43 | 94 | E1 | D4 | 92 | 1B | 97 | 92 | 39 | D6 | 98 | C1 | 06 | 22 | 35 |
|    | D6 | 98 | 26 | FC | 0F | 7F | 00 | 08 | CE | 00 | F2 | DF | F8 | 6F | 01 | 08 |
|    | 8C | 00 | F7 | 26 | F8 | CE | 00 | 80 | C6 | 1E | A6 | 00 | 3C | DE | F8 | 37 |
|    | BD | FC | CD | 33 | 38 | 08 | 8C | 00 | F3 | 27 | 08 | 5A | 26 | EC | 7C | 00 |
|    | F9 | 20 | E5 | 20 | FE | C6 | 06 | BD | F5 | 78 | 96 | D7 | 2B | FC | 96 | 91 |
|    | 26 | 06 | DE | A3 | DF | 9B | DF | 99 | BD | F7 | E8 | 4F | 97 | 8D | 97 | 8E |
|    | 97 | 8F | 96 | 92 | 85 | 20 | 27 | 03 | 7E | F9 | 90 | 86 | EB | 91 | A3 | 27 |
|    | F7 | 91 | A7 | 27 | F3 | 91 | A9 | 27 | EF | DC | CF | 93 | A3 | DD | 9D | 96 |
|    | 92 | 2B | 53 | DC | D1 | 27 | 4F | 05 | 05 | C6 | A3 | 3D | 05 | 97 | E1 | DC |
|    | 9D | 2B | 2E | DD | DD | 93 | B5 | 93 | B9 | 2A | 3B | 4F | 5F | DD | DF | DC |
|    | DD | 04 | 04 | 4D | 27 | 02 | C6 | FF | 96 | E1 | 3D | 7D | 00 | 9D | 2A | 05 |
|    | 43 | 53 | C3 | 00 | 01 | D3 | A1 | DD | A1 | DC | DF | D9 | A0 | 99 | 9F | 20 |
|    | 19 | 43 | 53 | C3 | 00 | 01 | DD | DD | 83 | 01 | 00 | 93 | B3 | 93 | B7 | 2A |
|    | 05 | CC | FF | FF | 20 | C7 | 4F | 5F | DD | A1 | DD | 9F | DC | 9D | D3 | 9F |

|    | 0  | 1  | 2  | 3  | 4  | 5  | 6  | 7  | 8  | 9  | A  | B  | C  | D  | E  | F  |
|----|----|----|----|----|----|----|----|----|----|----|----|----|----|----|----|----|
|    | DD | DD | 2A | 03 | 7E | F7 | ED | 93 | B5 | 7D | 00 | 92 | 2A | 02 | 93 | BD |
|    | 4D | 2B | 6A | DD | DD | 93 | B9 | 2A | 49 | CE | 00 | B9 | BD | F7 | C2 | 86 |
|    | 04 | BD | F7 | E8 | DC | C5 | 93 | 9B | DD | DD | BD | F7 | B1 | D3 | 9B | CE |
|    | 00 | C1 | BD | F7 | 82 | DC | 99 | 93 | A7 | 2B | 11 | DD | DD | 93 | C1 | 2A |
|    | 38 | CE | 00 | C1 | BD | F7 | C2 | 96 | DF | 44 | 97 | 8D | DC | C5 | 93 | A7 |
|    | 2B | 0A | 83 | 01 | 00 | 2A | 08 | 96 | 8D | 3D | 20 | 01 | 4F | 97 | 8D | 7E |
|    | F9 | 14 | DC | CF | 93 | B5 | 7D | 00 | 92 | 2A | 02 | 93 | BD | DD | 9B | DC |
|    | A7 | D3 | C1 | DD | 99 | 86 | 02 | 8D | 6F | 86 | 7F | 20 | CD | 86 | 08 | 7E |
|    | F8 | 9A | 93 | 99 | DD | DF | 2A | 0F | E3 | 00 | 2B | 04 | 86 | FF | 20 | 13 |
|    | D6 | DD | 50 | 86 | FF | 20 | 15 | A3 | 00 | 2A | 03 | 4F | 20 | 05 | D6 | DD |
|    | 4F | 20 | 09 | D6 | E0 | 59 | D6 | DF | 59 | 26 | 01 | 5C | D3 | 99 | DD | 99 |
|    | 39 | D6 | DE | 96 | DF | 3D | 97 | E0 | 96 | DD | D6 | DF | 3D | DB | E0 | 89 |
|    | 00 | 39 | 86 | 09 | 97 | E0 | 7F | 00 | DF | DC | DD | A3 | 00 | 2B | 0F | 0D |
|    | 79 | 00 | DF | 05 | 7A | 00 | E0 | 26 | F2 | 39 | E3 | 00 | 2A | F1 | 78 | 00 |
|    | DF | 05 | 7A | 00 | E0 | 26 | F3 | 39 | 8A | 01 | 97 | 91 | 39 | C3 | 01 | 00 |
|    | DD | DD | 86 | EB | 91 | A5 | 26 | 03 | 7E | F9 | 90 | 96 | DD | 2B | 03 | 7E |

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| F8 | 98 | D3 | B3 | 7D | 00 | 92 | 2A | 02 | D3 | BB | 4D | 2A | 5F | 43 | 53 |
| C3 | 00 | 01 | DD | DD | 93 | B7 | 2A | 58 | CE | 00 | B7 | BD | F7 | C2 | 86 |
| 40 | 8D | C5 | DC | 9B | 93 | C3 | 2B | 67 | DD | DD | C6 | FE | D4 | 94 | D7 |
| 94 | BD | F7 | B1 | 43 | 53 | C3 | 00 | 01 | D3 | 9B | CE | 00 | BF | BD | F7 |
| 82 | DC | A7 | 93 | 99 | 2B | 11 | DD | DD | 93 | BF | 2A | 3F | CE | 00 | BF |
| BD | F7 | C2 | 96 | DF | 44 | 97 | 8F | DC | A7 | 93 | C3 | 2B | 0A | 83 | 01 |
| 00 | 2A | 08 | 96 | 8F | 3D | 20 | 01 | 4F | 97 | 8F | 20 | 36 | 86 | 20 | 20 |
| 29 | DC | CF | C3 | 01 | 00 | D3 | B3 | 7D | 00 | 92 | 2A | 02 | D3 | BB | DD |
| 9B | DC | A7 | 93 | BF | DD | 99 | 86 | 80 | BD | F7 | E8 | 86 | 7F | 20 | C6 |
| 86 | 01 | 9A | 94 | 97 | 94 | 20 | 0B | 86 | 10 | BD | F7 | E8 | DC | A7 | DD |
| 9B | DD | 99 | 96 | 91 | 85 | 08 | 26 | 6B | DC | A5 | 93 | CB | 2A | 03 | 7F |
| 00 | 8F | 96 | 92 | 85 | 02 | 27 | 06 | 85 | 01 | 26 | 17 | 20 | 56 | DC | AD |
| 2A | 0B | 81 | EB | 26 | 07 | C1 | FF | 27 | 03 | 5D | 27 | 06 | DC | CD | 93 |
| A5 | 2B | 41 | 4F | 5F | 93 | 9D | 4D | 27 | 02 | C6 | FF | 54 | D7 | 8E | DC |
| A9 | 93 | C9 | 2B | 26 | DD | DD | 86 | 03 | 97 | E1 | DC | CF | 93 | A5 | 77 |
| 00 | DD | 76 | 00 | DE | 7A | 00 | E1 | 27 | 05 | 83 | 0A | 00 | 2A | F0 | DC |

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| DD | 83 | 01 | 00 | 2A | 11 | 96 | 8E | 3D | 20 | 01 | 4F | 97 | 8E | C6 | 02 |
| DA | 94 | 20 | 07 | 4F | 97 | 8E | C6 | FD | D4 | 94 | D7 | 94 | D6 | 93 | 96 |
| 92 | 85 | 80 | 26 | 0A | 96 | 91 | 85 | 82 | 26 | 08 | C4 | BF | 20 | 02 | CA |
| 40 | D7 | 93 | 96 | 92 | 85 | 08 | 26 | 64 | 85 | 10 | 26 | 5B | 85 | 80 | 2B |
| 3E | 96 | 93 | 84 | 60 | 81 | 40 | 27 | 36 | DC | C7 | 05 | 05 | C3 | 00 | 80 |
| DD | DD | C6 | A3 | D7 | DF | BD | F7 | B1 | 91 | 8E | 25 | 02 | 97 | 8E | 86 |
| FF | 97 | 90 | 96 | 02 | 8A | 10 | 97 | 02 | 96 | 92 | 85 | 40 | 26 | 07 | 4F |
| 97 | 8D | 97 | 8E | 97 | 8F | 96 | 91 | 84 | FE | 97 | 91 | 7E | F5 | 89 | 96 |
| 8D | 9A | 8E | 9A | 8F | 26 | D8 | 96 | 90 | 27 | 05 | 7A | 00 | 90 | 26 | D3 |
| 96 | 02 | 84 | EF | 97 | 02 | 20 | DE | 4F | 97 | 8D | 97 | 8F | C6 | 7F | D7 |
| 8E | 20 | C0 | D6 | 8C | 5A | 28 | 03 | C6 | 18 | 5A | CE | F2 | 58 | 3A | A6 |
| 00 | 2B | F7 | CA | 80 | D7 | 87 | 7E | FA | 4A | 5D | 27 | 54 | 96 | DD | 81 |
| 02 | 26 | 13 | 96 | 87 | 2B | 3B | D6 | 88 | C4 | 07 | 58 | CE | 00 | A3 | 3A |
| DC | DE | ED | 00 | 20 | 2C | 81 | E3 | 26 | 37 | 96 | E0 | 20 | 1C | 7E | FD |
| 0D | 96 | 88 | 81 | 08 | 2D | F7 | 81 | 30 | 24 | 04 | 81 | 20 | 2C | CB | 5D |
| 27 | 10 | 96 | DD | 81 | E2 | 26 | 19 | 96 | DF | 9A | 95 | 97 | 95 | 96 | 88 |

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 97 | 96 | D6 | 87 | C5 | 60 | 26 | 50 | C4 | 1F | D7 | 87 | 20 | 3C | 7E | F9 |
| A3 | 86 | 08 | D6 | 88 | C1 | 08 | 2D | 31 | D6 | 87 | C5 | 60 | 26 | 52 | 9A |
| 94 | 97 | 94 | D6 | 87 | 2B | 06 | 96 | D3 | 81 | FE | 27 | E1 | C4 | 1F | D7 |
| 87 | C6 | 01 | 96 | 89 | 27 | 01 | 5C | 96 | 8A | 27 | 01 | 5C | 96 | 8B | 27 |
| 01 | 5C | DB | 97 | D7 | 97 | 96 | 88 | 97 | 96 | 4F | 97 | 80 | 97 | D3 | 3B |
| 96 | D4 | 27 | 8D | 86 | 40 | 20 | BB | 96 | 87 | 16 | C4 | 07 | CE | F2 | 88 |
| 3A | 16 | A6 | 00 | 54 | 54 | 54 | C4 | 03 | CE | 00 | 89 | 3A | AA | 00 | A7 |
| 00 | D6 | 87 | 5C | D7 | 87 | C4 | 18 | C1 | 18 | 27 | 10 | D6 | 87 | C5 | 20 |
| 27 | C8 | C5 | 07 | 26 | C4 | C4 | 1F | D7 | 87 | 20 | 03 | 5F | D7 | 87 | 7E |
| FB | A7 | BD | FC | CD | 6A | 00 | 29 | 0F | 3C | EE | 02 | A7 | 00 | 38 | 6C |
| 03 | A6 | 00 | 81 | FC | 27 | 06 | 39 | C6 | 80 | 6F | 00 | 39 | A6 | 01 | 26 |
| 29 | 5F | A6 | 0A | 2A | F4 | 48 | 2B | 16 | A6 | 0B | A7 | 0A | 84 | 1F | 81 |
| 04 | 2E | 0C | 8A | 80 | A7 | 00 | 3C | 32 | 33 | CB | 0B | ED | 02 | 39 | 8C |
| 00 | D3 | 26 | 06 | 86 | 20 | 9A | 94 | 97 | 94 | CC | E0 | 00 | ED | 02 | 39 |
| 96 | 08 | DC | 0D | C3 | 64 | 00 | DD | 0B | 86 | 1E | 97 | 08 | 7F | 00 | D3 |
| 86 | 10 | 7E | FA | 13 | 7A | 00 | 80 | 2A | 03 | 7E | FA | 11 | 29 | 09 | 27 |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 13 | 96 | 02 | 49 | 76 | 00 | 81 | 3B | 96 | 02 | 2A | 1D | 86 | 09 | 97 | 80 |
|   | 3B | 7E | FA | 50 | 96 | 02 | 2B | C8 | 96 | 81 | 43 | BD | FA | 92 | 96 | D3 |
|   | 27 | EF | DC | 0B | C3 | 08 | 00 | DD | 82 | DC | 82 | DD | 0B | 86 | FF | 97 |
|   | 80 | 96 | 08 | 96 | 0D | 86 | 1E | 97 | 08 | 3B | 96 | D3 | 26 | 1D | 96 | 80 |
|   | 26 | 15 | 73 | 00 | 80 | 96 | 08 | DC | 0D | 96 | 08 | DC | 0B | C3 | 40 | 00 |
|   | DD | 0B | 86 | 1E | 97 | 08 | 3B | 86 | 0C | 97 | 08 | 96 | 08 | DC | 0B | C3 |
|   | 04 | 00 | DD | 0B | CE | 00 | D3 | D6 | D3 | 2B | 8A | 27 | 14 | 7A | 00 | 80 |
|   | 26 | 03 | 7E | FC | 7E | 96 | 08 | 44 | 74 | 00 | 81 | 49 | 97 | 08 | 96 | 0D |
|   | 3B | D6 | 87 | 2B | 56 | 96 | 88 | 81 | 06 | 26 | 03 | 7E | FC | FA | D6 | D7 |
|   | 2B | 1A | C5 | 40 | 27 | 11 | C4 | 07 | 17 | 58 | 58 | CE | F2 | 00 | 3A | 4C |
|   | 84 | 03 | 97 | D7 | 7E | FC | FD | 86 | 04 | 97 | 08 | 3B | CE | 00 | 89 | A6 |
|   | 00 | AA | 01 | AA | 02 | 27 | 20 | 96 | 8C | 16 | 54 | 54 | 54 | CE | 00 | 89 |
|   | 3A | 3C | 16 | C4 | 07 | CE | F2 | 88 | 3A | 16 | A6 | 00 | 38 | A5 | 00 | 26 |
|   | 71 | 5C | D7 | 8C | 48 | 24 | F6 | D6 | D7 | 20 | BB | D6 | 87 | C5 | 20 | 26 |
|   | 1B | C4 | 1F | CE | F2 | 58 | 3A | A6 | 00 | 2B | 37 | 8B | 80 | C6 | E2 | DD |
|   | DD | CC | F2 | 56 | DD | DF | CE | 00 | DD | 7E | FC | FD | C4 | 07 | CE | F2 |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 88 | 3A | A6 | 00 | D6 | 87 | C4 | 1F | 54 | 54 | 54 | CE | 00 | 89 | 3A | D6 |
|   | 87 | A5 | 00 | 27 | CC | 5C | D7 | 87 | 48 | 24 | F6 | D6 | 87 | C4 | 1F | D7 |
|   | 87 | 3B | 08 | 8C | F2 | 70 | 27 | 16 | 7C | 00 | 87 | A6 | 00 | 2B | F3 | D6 |
|   | 87 | 17 | C4 | 1F | 85 | 40 | 26 | 02 | D7 | 87 | C1 | 18 | 2D | 03 | 7F | 00 |
|   | 87 | 3B | CE | F2 | 58 | 3A | 5C | D7 | 8C | A6 | 00 | 2B | 8A | 97 | 88 | 8A |
|   | 40 | E6 | 18 | C1 | F0 | 24 | 06 | CE | 00 | 00 | 3A | E6 | 00 | DD | DD | CC |
|   | 03 | 00 | DD | D3 | CE | 00 | DD | DF | D5 | 96 | 08 | 8A | 01 | 97 | 08 | 96 |
|   | 0D | 86 | 0A | 97 | 80 | CE | 00 | D3 | 8D | 26 | 43 | 97 | 81 | 3B | C1 | 3F |
|   | 26 | E7 | CC | FF | 00 | DD | D3 | 97 | 80 | CE | 00 | DD | DF | D5 | DC | 0B |
|   | C3 | 0C | 00 | DD | 0B | DD | 82 | 96 | 08 | 96 | 0D | 86 | 1E | 97 | 08 | 3B |
|   | 6A | 00 | E6 | 00 | 27 | 10 | 3C | C1 | 3F | 27 | 12 | EE | 02 | A6 | 00 | 38 |
|   | 6C | 03 | A7 | 0A | 20 | 17 | A6 | 01 | C6 | 3F | E7 | 00 | 39 | EE | 02 | EC |
|   | 00 | 38 | ED | 02 | A6 | 0A | 84 | 1F | 4C | A7 | 00 | A6 | 01 | 36 | C6 | 08 |
|   | A8 | 01 | 48 | 24 | 02 | 88 | 1D | 5A | 26 | F8 | A7 | 01 | 32 | 39 | DC | 09 |
|   | C3 | 04 | 00 | 7D | 00 | 08 | DD | 0B | 86 | 0C | 97 | 08 | 96 | 87 | 2B | 05 |
|   | CE | F2 | 40 | 20 | 08 | CE | F2 | 4C | 20 | 03 | CE | F2 | 14 | DF | D5 | CC |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 42 | 00 | DD | D3 | A6 | 00 | 84 | 3F | 97 | 88 | 7E | FC | 69 | 81 | 02 | 27 |
|   | 07 | 81 | 06 | 27 | 03 | 7E | FD | A7 | D6 | DD | C1 | 04 | 26 | 51 | CE | 00 |
|   | 00 | C6 | 03 | A6 | DF | A7 | 8D | 08 | 5A | 26 | F8 | CE | 00 | D3 | 96 | DE |
|   | 85 | 80 | 27 | 2D | 84 | 1F | 16 | 27 | 21 | 84 | 03 | 27 | 17 | 81 | 03 | 16 |
|   | 27 | 18 | D6 | DE | 58 | C4 | 38 | 96 | 07 | 84 | C7 | 1B | 97 | 07 | D6 | DE |
|   | C4 | 03 | 20 | 06 | 54 | 54 | C1 | 06 | 25 | 07 | 96 | D7 | 84 | F8 | 1B | 97 |
|   | D7 | E6 | 0B | C5 | 40 | 26 | 0D | C5 | 20 | 27 | 04 | 86 | FF | A7 | 09 | 3B |
|   | 86 | 01 | 20 | F9 | C4 | 3F | 27 | F8 | 17 | C0 | 38 | 25 | 16 | 27 | 27 | 81 |
|   | 39 | 27 | 0C | 81 | 3F | 27 | 1F | CE | 00 | 91 | 3A | 6F | 00 | 20 | 17 | 6F |
|   | 08 | 20 | 13 | 80 | 20 | 25 | 0F | 16 | 3C | BD | FE | 43 | 38 | 54 | 54 | 54 |
|   | 3A | 43 | A4 | 05 | A7 | 05 | 3B | 5D | 27 | 84 | 96 | DD | 81 | 03 | 26 | F6 |
|   | E6 | 0B | C1 | 38 | 27 | F0 | C1 | 39 | 27 | 4A | C1 | 3A | 27 | 77 | 22 | E6 |
|   | C0 | 20 | 2B | E2 | 37 | 58 | 4F | C3 | 00 | A3 | DD | 85 | 33 | 17 | 54 | 54 |
|   | 54 | 3C | 8C | 00 | E2 | 27 | 1A | 8D | 6A | CE | 00 | D8 | 3A | A5 | 0F | 26 |
|   | 0C | AA | 00 | A7 | 00 | 38 | 3C | EC | 0C | DE | 85 | ED | 00 | 38 | 7E | FD |
|   | 6B | 8D | 50 | CE | 00 | D8 | 3A | 36 | 43 | A4 | 00 | A7 | 00 | 32 | CE | 00 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | E7 | 3A | 20 | DD | EC | 0C | 8C | 00 | E2 | 27 | 14 | 96 | EA | 43 | A4 | 0C |
|   | 9A | DB | 97 | DB | 43 | 94 | 92 | D4 | DB | 1B | 97 | 92 | 7E | FD | 6B | 9A |
|   | EA | 97 | EA | 43 | 94 | 92 | D4 | EA | 1B | 97 | 92 | 96 | EA | 43 | 94 | DB |
|   | 97 | DB | 7E | FD | 6B | A6 | 0C | 84 | 0F | 16 | 43 | 94 | 93 | E4 | 0D | 1B |
|   | 97 | 93 | 3B | 37 | 16 | C4 | 07 | CE | F2 | 88 | 3A | A6 | 00 | 33 | 39 | D6 |
|   | 11 | 96 | 12 | CE | 00 | E2 | D6 | E2 | 27 | 16 | 2B | 0B | C1 | 3F | 27 | 10 |
|   | BD | FC | A0 | 97 | 13 | 20 | 0E | 53 | 26 | 2B | 98 | E6 | 84 | 3F | 27 | 0E |
|   | CC | FF | 00 | DD | E2 | 96 | 09 | 44 | 26 | 01 | 4A | 97 | 84 | 3B | D6 | 84 |
|   | 27 | 08 | 96 | 09 | 44 | 10 | 80 | 30 | 25 | E6 | CC | 00 | EC | DD | E4 | 96 |
|   | 12 | 85 | C0 | 27 | 39 | BD | FA | 92 | 96 | E4 | 26 | D4 | 96 | E2 | 26 | D5 |
|   | 96 | E3 | 26 | 29 | 5D | 2B | 3F | D6 | ED | C1 | FE | 27 | 5E | 96 | E6 | 2A |
|   | 48 | C1 | FF | 26 | 04 | 8D | 63 | 20 | BC | 17 | 84 | E0 | 27 | 40 | 84 | C0 |
|   | 81 | C0 | 27 | 3A | 81 | 80 | 27 | 0D | 8D | 50 | 7E | FD | 61 | 4F | 7F | 00 |
|   | E2 | 97 | 13 | 20 | A0 | C4 | 0F | 58 | 58 | CE | F2 | 00 | 3A | A6 | 01 | 27 |
|   | 1D | 8D | 30 | 7E | FD | 61 | D6 | EC | C1 | E2 | 27 | 17 | C1 | 03 | 26 | 0E |
|   | 96 | E6 | 2A | 05 | 8D | 24 | 7E | FD | B0 | CE | F2 | 48 | 20 | 10 | CE | F2 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 44 | 20 | 0B | 96 | E6 | 84 | 3F | 8A | 80 | 97 | E6 | CE | F2 | 4C | 8D | 03 |
|   | 7E | FE | 75 | 08 | 86 | 41 | C6 | 80 | 20 | 0B | CE | 00 | EC | 86 | 02 | D6 |
|   | 98 | D7 | EC | C6 | 40 | DF | E4 | 97 | E2 | 96 | E6 | 84 | 3F | 1B | 97 | 13 |
|   | CE | 00 | E2 | 6F | 01 | 7E | FC | CD | DC | 08 | 96 | 84 | 27 | 09 | 2B | 04 |
|   | 8A | 80 | 20 | 01 | 4F | 97 | 84 | 3B | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | FE | 4F | FF | 38 | FB | 3A | F3 | 81 | F2 | E0 | FC | DE | F3 | 4A | F3 | E6 |

The computer program listings for the sequencer 155 are as follows:

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 10 | 20 | 30 | F7 | 02 | 5F | 05 | CD | 0D | 4D | 20 | F8 | F6 | B7 | 2C |
|   | 13 | 5F | A6 | FF | B7 | 29 | B6 | 2C | 5C | 3F | 2F | 16 | 2F | B8 | 2E | 48 |
|   | 24 | 02 | A8 | 1D | 3A | 2F | 26 | F7 | B7 | 2E | 81 | 02 | 63 | 07 | AE | 34 |
|   | AD | D3 | AE | 35 | 81 | AE | 40 | AD | CC | AE | 41 | 81 | 12 | 61 | 0D | 60 |
|   | 04 | 0B | 5F | 10 | 81 | 00 | 60 | 06 | AE | 4B | 09 | 5F | 07 | 81 | AE | 47 |
|   | 07 | 5F | 01 | 81 | 13 | 61 | 81 | EB | 11 | E0 | 13 | B7 | 39 | 3F | 3A | A6 |
|   | 08 | B7 | 37 | B6 | 39 | E0 | 11 | 25 | 02 | B7 | 39 | 39 | 3A | 3A | 37 | 27 |
|   | 04 | 38 | 39 | 20 | EE | 33 | 3A | B6 | 3A | 2A | 01 | 4A | 81 | 00 | 00 | 00 |

```
   0  1  2  3  4  5  6  7   8  9  A  B  C  D  E  F
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00

0  1  2  3  4  5  6  7   8  9  A  B  C  D  E  F
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00

0  1  2  3  4  5  6  7   8  9  A  B  C  D  E  F
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
  00 00 00 00 00 00 00 00  00 00 00 00 00 00 00 00
```

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |
|   | 00 | 00 | 00 | 00 | 00 | 00 | 00 | 00 | 00 | 00 | 00 | 00 | 00 | 00 | 00 | 00 |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 9B | 4F | AE | 08 | F7 | 5A | 2A | FC | AE | 04 | BF | 06 | 1C | 09 | 99 | AE |
|   | 20 | F7 | 46 | 5C | 2A | FB | 46 | 46 | 46 | AE | 20 | F8 | 27 | 02 | 1D | 09 |
|   | F6 | 46 | 5C | 2A | F6 | 46 | 46 | 46 | 46 | 24 | E4 | AE | 20 | 7F | 5C | 2A |
|   | FC | 0C | 09 | 02 | 14 | 61 | A6 | 12 | B7 | 09 | A6 | FF | B7 | 04 | B7 | 05 |
|   | AE | 04 | 4F | B7 | 06 | B6 | 02 | BF | 06 | B7 | 64 | B6 | 03 | B7 | 65 | 06 |
|   | 64 | 5F | 15 | 64 | 13 | 64 | A6 | 82 | B7 | 06 | B6 | 03 | B7 | 65 | A6 | 42 |
|   | B7 | 06 | B6 | 03 | 48 | 48 | 48 | 48 | AA | 0F | 43 | B7 | 64 | A6 | 22 | B7 |
|   | 06 | B6 | 03 | AA | F0 | 43 | 97 | 26 | 06 | 14 | 64 | 12 | 64 | 20 | 32 | 5A |
|   | 26 | 04 | 12 | 64 | 20 | 2B | 5A | 27 | 28 | 5A | 26 | 04 | 14 | 64 | 20 | 21 |
|   | B6 | 65 | A4 | F0 | B7 | 65 | 5A | 26 | 04 | A6 | 03 | 20 | 10 | 5A | 26 | 04 |
|   | A6 | 05 | 20 | 09 | 5A | 26 | 04 | A6 | 02 | 20 | 02 | A6 | 01 | BA | 65 | B7 |
|   | 65 | 5F | B6 | 65 | A4 | 0F | A1 | 01 | 27 | 0F | 5C | A1 | 02 | 27 | 0A | 5C |
|   | A1 | 05 | 27 | 05 | A1 | 03 | 26 | 3A | 5C | 18 | 62 | B6 | 64 | 44 | 44 | 44 |
|   | 44 | EA | 80 | B7 | 3D | 1E | 60 | BE | 65 | 4F | 58 | 24 | 02 | A6 | F0 | 58 |
|   | 24 | 02 | AA | 0F | B7 | 40 | 26 | 02 | 16 | 63 | 4F | 58 | 24 | 02 | A6 | F0 |
|   | 58 | 24 | 02 | AA | 0F | B7 | 41 | 26 | 06 | 07 | 63 | 03 | CC | 09 | DF | CC |

|   | 0  | 1  | 2  | 3  | 4  | 5  | 6  | 7  | 8  | 9  | A  | B  | C  | D  | E  | F  |
|---|----|----|----|----|----|----|----|----|----|----|----|----|----|----|----|----|
|   | 0A | 0E | 03 | 64 | 07 | 04 | 64 | 1E | 12 | 62 | 20 | 1A | 04 | 64 | 04 | 14 |
|   | 62 | 20 | 13 | B6 | 64 | 49 | 49 | 49 | 49 | A4 | 06 | A1 | 06 | 26 | 03 | 4F |
|   | 14 | 63 | B7 | 62 | 16 | 62 | A6 | 1E | B7 | 22 | A6 | 14 | B7 | 4B | B7 | 4E |
|   | B7 | 4A | A6 | 64 | B7 | 49 | B7 | 4D | B7 | 4C | B7 | 54 | A6 | 05 | B7 | 47 |
|   | B7 | 48 | B7 | 50 | 07 | 62 | 06 | B7 | 4B | B7 | 4C | B7 | 54 | 0B | 64 | 02 |
|   | 37 | 49 | 08 | 64 | 04 | A6 | 05 | B7 | 4A | 07 | 62 | 13 | B6 | 49 | B7 | 4D |
|   | B6 | 4A | B7 | 4E | B6 | 65 | AA | F0 | 43 | B7 | 58 | B7 | 5A | 20 | 35 | 0E |
|   | 64 | 02 | 38 | 4D | 0C | 64 | 04 | 37 | 4C | 37 | 54 | B6 | 65 | AA | F0 | 43 |
|   | A1 | 09 | 98 | 26 | 0A | 07 | 64 | 03 | 05 | 64 | 04 | 1A | 62 | 4F | 99 | 49 |
|   | B7 | 58 | B7 | 5A | A4 | FE | 26 | 0C | B6 | 64 | A4 | 30 | 44 | 44 | 44 | 44 |
|   | B7 | 3B | 3F | 3C | 5F | 09 | 65 | 0F | 5C | 0B | 65 | 0B | 5C | 0D | 65 | 07 |
|   | 5C | 0F | 65 | 0D | 5C | 20 | 0A | 0E | 65 | 05 | 26 | 05 | CC | 0E | 21 | 1E |
|   | 60 | 58 | 58 | BF | 21 | 26 | 02 | 3F | 58 | 07 | 62 | 0A | B6 | 58 | 48 | B1 |
|   | 21 | 22 | 0C | 44 | 20 | 0F | B6 | 58 | A4 | FE | 40 | BB | 21 | 2A | 06 | 18 |
|   | 61 | 16 | 61 | 20 | 1E | B7 | 5C | B7 | 5E | 99 | B6 | 58 | 27 | 0B | 0A | 62 |
|   | 08 | 99 | 39 | 24 | 39 | 23 | 4A | 26 | F9 | B6 | 24 | BE | 23 | 49 | 59 | B7 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 26 | BF | 25 | 0F | 60 | 08 | B6 | 62 | A4 | 06 | AB | 38 | B7 | 3D | 06 | 64 |
|   | 04 | A6 | 87 | 20 | 07 | A6 | 8D | 04 | 64 | 02 | A6 | 89 | B7 | 06 | B6 | 03 |
|   | B7 | 21 | CC | 0A | BC | B6 | 29 | 26 | 0A | A6 | 0A | B7 | 29 | A6 | 48 | B7 |
|   | 08 | 1F | 09 | A6 | 0E | B7 | 2B | 80 | 1E | 02 | B6 | 08 | AB | CF | B7 | 08 |
|   | 1F | 09 | B6 | 29 | 27 | 5F | 4A | B7 | 29 | 2A | 3D | 3A | 2A | 27 | 2B | 2B |
|   | 16 | 98 | 2F | 01 | 99 | 46 | 01 | 02 | 00 | 36 | 2D | B8 | 2D | 2A | 02 | 20 |
|   | 00 | 24 | 13 | 11 | 02 | 20 | 44 | A6 | 09 | B7 | 2A | B6 | 2C | B7 | 2D | 12 |
|   | 5F | 01 | FF | 00 | 3D | 20 | 10 | 02 | 20 | 31 | 3F | 29 | 02 | 5F | E4 | 3A |
|   | 29 | 01 | FF | 00 | 3D | 20 | 20 | DB | 27 | 0E | A1 | 09 | 99 | 2F | 01 | 98 |
|   | 26 | 02 | 25 | 07 | 36 | 2D | 20 | 13 | 4D | 2F | 02 | 16 | 60 | 10 | 5F | B6 |
|   | 2D | B7 | 2C | 20 | 06 | B6 | 2B | 2B | 02 | 3A | 2B | 3C | 31 | 1F | 02 | B6 |
|   | 31 | A4 | 0F | 26 | 06 | 3C | 36 | 2A | 02 | 3F | 36 | 80 | 17 | 60 | 9C | 11 |
|   | 02 | 3F | 2A | 9A | 3F | 29 | 13 | 63 | 11 | 63 | 1D | 60 | CD | 0D | 4D | B6 |
|   | 2B | 2A | F3 | 11 | 5F | 12 | 5F | 3F | 2E | AD | 6B | F6 | B7 | 42 | A4 | 3F |
|   | B7 | 38 | 08 | 62 | 1D | B6 | 62 | A4 | 06 | AB | 18 | 3D | 58 | 27 | 06 | 10 |
|   | 60 | B1 | 38 | 27 | 1A | 4C | 05 | 63 | 01 | 4C | 3D | 5C | 27 | 04 | B1 | 38 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 27 | 0B | 0F | 60 | C1 | 1C | 60 | B6 | 3D | B1 | 38 | 26 | B9 | 11 | 60 | B6 |
|   | 42 | A4 | C0 | 26 | 03 | CC | 0C | 93 | 48 | 27 | 08 | 25 | A9 | 3F | 30 | AD |
|   | 27 | 20 | 1A | AD | 21 | F6 | B7 | 30 | A4 | 1F | 4A | B7 | 3F | A1 | 03 | 22 |
|   | 95 | AD | 15 | 26 | 0E | AD | 0F | AD | 0F | 3A | 3F | 26 | FA | AE | 1E | AD |
|   | 07 | 27 | 21 | CC | 0D | 48 | AE | 43 | 5C | CD | 0D | 4D | B6 | 2B | 2B | F9 |
|   | B6 | 2B | 2A | 03 | CC | 0A | BC | CD | 0D | 4D | 01 | 5F | F3 | B6 | 2C | F7 |
|   | 11 | 5F | BC | 99 | B6 | 30 | A1 | 03 | 23 | 74 | A1 | E2 | 27 | 03 | CC | 0C |
|   | 9B | B6 | 45 | B7 | 66 | B6 | 44 | 4C | 27 | 1D | A1 | 40 | 22 | F0 | 4A | 26 |
|   | 26 | 0D | 60 | 04 | 10 | 61 | 20 | 09 | 00 | 60 | 04 | 1E | 5F | 20 | 02 | 1C |
|   | 5F | 1E | 61 | 15 | 5F | 20 | 2E | 18 | 60 | 07 | 64 | 19 | A6 | 0D | 04 | 64 |
|   | 02 | A6 | 09 | B7 | 06 | 20 | 0E | 19 | 60 | 07 | 64 | 09 | A6 | 8D | 04 | 64 |
|   | 02 | A6 | 89 | B7 | 06 | 0D | 60 | 04 | 1A | 5F | 20 | 09 | 00 | 60 | 04 | 18 |
|   | 5F | 20 | 02 | 16 | 5F | BD | BC | 09 | 62 | 05 | 12 | 63 | CC | 0C | A4 | A6 |
|   | 04 | 0C | 60 | 07 | B6 | 58 | 00 | 60 | 02 | B6 | 5C | CC | 0C | 8E | BD | BC |
|   | B6 | 45 | 4C | 4C | 27 | 4A | 4C | 27 | 30 | 02 | 61 | 20 | 0D | 60 | 06 | 00 |
|   | 61 | 0E | CC | 0C | 9B | 00 | 60 | 05 | 0F | 5F | F7 | 20 | 03 | 0D | 5F | F2 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 05 | 5F | 09 | B6 | 45 | 2A | 75 | 0E | 42 | 72 | 20 | 08 | B6 | 30 | 26 | 2B |
|   | B6 | 45 | 2A | 50 | 4C | 27 | 65 | 20 | D9 | 0D | 60 | 0B | 08 | 62 | 04 | A6 |
|   | 04 | 20 | 6B | 12 | 63 | 20 | 3A | B6 | 58 | 00 | 60 | 62 | B6 | 5C | 20 | 5E |
|   | A6 | 21 | 0D | 60 | 59 | 10 | 63 | A6 | 29 | 20 | 53 | 09 | 62 | 5D | 14 | 5F |
|   | 00 | 30 | 0A | B6 | 44 | B7 | 32 | B6 | 45 | B7 | 33 | 20 | 14 | B6 | 45 | B4 |
|   | 46 | 97 | B6 | 44 | A0 | 39 | 27 | 07 | 4A | 26 | 40 | BF | 32 | 20 | 02 | BF |
|   | 33 | CC | 0C | A4 | 08 | 62 | 34 | 14 | 5F | 0D | 60 | 0E | 48 | 48 | 48 | 48 |
|   | B7 | 32 | B6 | 34 | 44 | 44 | 44 | 44 | 20 | 14 | E7 | 12 | 08 | 62 | 25 | 0C |
|   | 60 | F0 | 01 | 60 | 07 | 0B | 62 | 04 | B6 | 59 | 20 | 02 | E6 | 10 | B7 | 45 |
|   | 4F | 20 | 11 | BD | BC | 09 | 66 | 03 | 02 | 61 | E1 | AE | 44 | B6 | 38 | BD |
|   | 84 | CC | 0A | C6 | 3F | 2E | B6 | 61 | A4 | 0C | B7 | 43 | AE | 44 | A6 | 40 |
|   | 08 | 60 | 0C | 04 | 61 | 09 | 06 | 61 | 06 | 09 | 62 | 04 | 00 | 63 | 01 | 48 |
|   | BA | 38 | BD | 84 | 0F | 44 | 4F | 5A | 08 | 60 | 14 | A6 | E2 | 04 | 61 | 52 |
|   | 06 | 61 | 4F | A6 | 02 | BD | 84 | AE | 2E | BD | 85 | BD | AB | 20 | 60 | A6 |
|   | 08 | 0D | 60 | 09 | A6 | 04 | 09 | 62 | 04 | 00 | 63 | 01 | 4C | BD | 84 | AE |
|   | 2E | BD | 85 | AE | 45 | 01 | 44 | 02 | BD | AB | BD | 85 | AE | 02 | BD | 85 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | AE | 03 | BD | 85 | AE | 22 | BD | 85 | 0C | 60 | 36 | 01 | 60 | 0A | AE | 4F |
|   | BD | 85 | BD | 85 | BD | 85 | 20 | 27 | AE | 53 | BD | 85 | BD | 85 | BD | 85 |
|   | 20 | 1D | 09 | 62 | 0E | 00 | 63 | 0B | 4C | BD | 84 | AE | 2E | BD | 85 | BD |
|   | AB | 20 | 08 | BD | 84 | AE | 2E | BD | 85 | AE | 45 | BD | 85 | AE | 43 | BD |
|   | 85 | AE | 2E | BD | 85 | CC | 0A | C6 | 4F | BD | BE | 20 | F8 | 07 | 60 | 03 |
|   | CC | 0A | BC | BF | 20 | 08 | 61 | 3B | 0F | 31 | 03 | CC | 0D | B9 | 08 | 62 |
|   | 32 | 07 | 64 | 03 | 05 | 64 | 2C | AE | 47 | 10 | 62 | A6 | 01 | BD | DB | E6 |
|   | 12 | A1 | 7F | 27 | 18 | E0 | 10 | 23 | 18 | B1 | 3A | 22 | 10 | B7 | 37 | BE |
|   | 58 | 5A | 27 | 05 | BB | 37 | 5A | 26 | FB | B1 | 36 | 23 | 04 | 14 | 02 | 20 |
|   | 02 | 15 | 02 | 0A | 5F | 03 | 01 | 61 | 15 | BE | 32 | 09 | 62 | 0C | 9F | B4 |
|   | 40 | 97 | B6 | 33 | B4 | 41 | B7 | 35 | B7 | 28 | BF | 34 | BF | 27 | B6 | 27 |
|   | B7 | 00 | B6 | 28 | B7 | 01 | BE | 20 | 81 | 1F | 31 | B6 | 00 | B1 | 27 | 26 |
|   | 60 | B6 | 01 | B1 | 28 | 26 | 5A | 06 | 02 | 57 | B6 | 03 | B8 | 21 | 27 | 04 |
|   | 16 | 61 | 20 | 02 | 17 | 61 | 0E | 61 | 08 | 3A | 22 | 26 | D9 | A6 | 1E | B7 |
|   | 22 | 05 | 60 | 4C | 3D | 3E | 27 | 02 | 3A | 3E | AE | 07 | E6 | 4F | 27 | 02 |
|   | 6A | 4F | 5A | 2A | F7 | 0A | 62 | 04 | B6 | 58 | 26 | 22 | B6 | 3B | 27 | 1E |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | BE | 3C | 2A | 03 | 97 | BF | 3C | B3 | 3B | 23 | 03 | 5F | BF | 3C | 1C | 62 |
|   | 1E | 62 | A3 | 01 | 22 | 08 | 27 | 04 | 1D | 62 | 20 | 02 | 1F | 62 | CC | 0E |
|   | 66 | 9B | 3F | 04 | 3F | 05 | A6 | 81 | B7 | 06 | 1E | 02 | 1F | 02 | 20 | FA |
|   | 14 | 60 | AE | 47 | B6 | 58 | 0A | 62 | 02 | 26 | 33 | CC | 0F | 1C | B6 | 00 |
|   | B8 | 34 | 44 | BA | 23 | BA | 27 | B7 | 27 | B6 | 01 | 46 | BA | 24 | BA | 28 |
|   | B7 | 28 | CC | 0E | B2 | B6 | 01 | 48 | B4 | 28 | B7 | 28 | B6 | 00 | 49 | B4 |
|   | 27 | B7 | 27 | CC | 0F | 12 | 15 | 60 | AE | 4B | B6 | 5C | 27 | CD | 6D | 13 |
|   | 27 | 51 | A6 | 01 | BD | D7 | E1 | 12 | 22 | 49 | 0F | 61 | 06 | 3D | 3E | 26 |
|   | 40 | 20 | 1C | 05 | 60 | 05 | 0A | 61 | 12 | 20 | 06 | 0C | 62 | 1A | 0C | 61 |
|   | 0A | 6D | 09 | 26 | 2C | 6D | 0A | 26 | 28 | 20 | 04 | 6D | 0B | 26 | 22 | 05 |
|   | 60 | 04 | 1A | 61 | 20 | 02 | 1C | 61 | E7 | 10 | 6A | 13 | 04 | 60 | BF | CC |
|   | 0F | 37 | F6 | E7 | 08 | E6 | 02 | E7 | 0A | E6 | 03 | E7 | 0B | A6 | 0A | B7 |
|   | 3E | 20 | 71 | E6 | 10 | 27 | 55 | 4A | E1 | 12 | 25 | 50 | 0F | 61 | 06 | 3D |
|   | 3E | 26 | 61 | 20 | 26 | 05 | 60 | 05 | 0B | 61 | 0E | 20 | 06 | 0E | 62 | 24 |
|   | 0D | 61 | 06 | 6D | 08 | 26 | 4D | 20 | 12 | E6 | 0A | 1A | 60 | 2A | 02 | 1B |
|   | 60 | E0 | 03 | 0B | 60 | 03 | 2A | 01 | 4F | E7 | 0A | 04 | 60 | 04 | 1D | 61 |

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
|   | 20 | 02 | 1B | 61 | A6 | FF | BD | D7 | E7 | 10 | 6C | 13 | 05 | 60 | 4B | CC |
|   | 0E | 55 | E6 | 01 | E7 | 09 | A6 | 0A | B7 | 3E | 20 | 18 | 0F | 61 | 15 | 05 |
|   | 5F | 12 | 05 | 60 | 0D | 03 | 60 | 0C | 13 | 60 | 1F | 61 | A6 | 1E | B7 | 22 |
|   | 20 | 02 | 12 | 60 | BE | 20 | 81 | B6 | 01 | 48 | BA | 26 | BA | 28 | B7 | 28 |
|   | B6 | 00 | 49 | BA | 25 | BA | 27 | B7 | 27 | B6 | 58 | A4 | FE | 26 | 08 | 3C |
|   | 3C | 0E | 61 | 03 | 0C | 62 | DD | CC | 0E | B2 | B6 | 00 | B8 | 34 | 44 | B4 |
|   | 27 | B7 | 27 | B6 | 01 | 46 | B4 | 28 | B7 | 28 | B6 | 58 | A4 | FE | 26 | A2 |
|   | 3A | 3C | 0E | 61 | 9D | 0E | 62 | BC | CC | 0F | 12 | 00 | 00 | 00 | 00 | 00 |
|   | 9C | 33 | 02 | 26 | FE | A6 | FF | B7 | 06 | 3F | 09 | 83 | AE | 01 | A6 | F0 |
|   | AD | 49 | A9 | BA | AD | 45 | 5A | 27 | F5 | 4F | 83 | AE | 20 | F7 | 46 | 5C |
|   | 26 | FB | 46 | AE | 20 | F8 | 26 | FE | F6 | 46 | 5C | 2A | F8 | 46 | 46 | 24 |
|   | EA | 83 | AE | C8 | BF | 27 | AE | 81 | BF | 2A | 4F | BD | 27 | 3C | 29 | 26 |
|   | FA | 3C | 28 | 09 | 28 | F5 | 43 | 26 | FE | 83 | 9A | 9B | 2C | FE | B0 | 7C |
|   | 26 | FE | B3 | 7D | 26 | FE | 0B | 32 | FD | 20 | AE | E7 | 04 | A6 | 55 | F7 |
|   | F1 | 26 | FE | 48 | 2B | F9 | 81 | 3C | 02 | 80 | 1F | 09 | 37 | 32 | 80 | 14 |
|   | 0F | EA | 0F | EC | 0F | E7 | 0F | 80 | 0A | 38 | 0A | 25 | 08 | 00 | 08 | 00 |

We claim:

1. A method for controlling an environmental condition within a zone including:
    generating a plurality of signals representative of the status of a plurality of signalling devices;
    converting selected of said status signals to digital data signals and directing said data signals and unconverted status signals to computing means;
    performing algorithmic decisional functions relative to said signals received at said computing means;
    transmitting digital output signals from said computing means along a communication bus for reception by a plurality of uniquely, digitally addressable load devices coupled to said communication bus and adapted to effect control of a condition of a zone, and;
    periodically receiving at said computing means digital input signals transmitted from at least one of said load devices.

2. A method for controlling an environmental condition in a zone including:
    providing a zone controller incorporating a microcomputer and adapted to communicate with a level one bus having a plurality of uniquely, digitally addressable load devices coupled thereto;
    scanning and storing the output values of a plurality of sensors and setpoint devices coupled to said controller;
    providing a reset signal for assuring proper operation of the program embodied in said microcomputer;
    rescanning and storing said output values of said sensors and setpoint devices;
    comparing said output values existing prior to said reset signal with those same values existing subsequent to said reset signal;
    initiating operation of a control algorithm embodied in said microcomputer for performing algorithmic decisional functions relative to said output values;
    selectively transmitting digital output signals to at least one of said load devices for effecting control of an environmental condition within said zone, and;
    periodically receiving digital input signals from at least one of said load devices.

3. The method set forth in claim 2 wherein said initiating step includes the steps of generating a polling message to each of every possible digital address for load devices that may be coupled to said bus;
    receiving and storing a responsive identifier signal unique to the address of each load device actually coupled to said bus;
    comparing said possible digital addresses with said addresses responsively received, and;
    thereafter selectively transmitting digital output signals only to load devices actually coupled to said bus.

4. The method set forth in claim 3 and further including the steps of:
    generating a bus reset signal for resetting load devices coupled to said bus, and;
    generating a fault detection signal for assuring that said bus is not inadvertently short circuited, said generating steps occurring prior to said scanning and storing step.

5. The method set forth in claim 2 and further including the steps of:
    generating a bus reset signal for resetting load devices coupled to said bus;
    generating a fault detection signal for assuring that said bus is not inadvertently short circuited, said generating steps occurring prior to said scanning and storing step.

6. A method for controlling a condition in a zone including:
    providing a zone controller incorporating a microcomputer and adapted to communicate with a level one bus having a plurality of uniquely, digitally addressable load devices coupled thereto, said load devices including at least one sequence panel adapted to control heat transfer stages;
    determining the number of heat transfer stages comprising heating stages coupled to said sequence panel;
    determining the bandwidth of a heating proportional band, and;
    controllably actuating said heating stages in a manner to be substantially evenly distributed across said bandwidth.

7. The method set forth in claim 6 further including the steps of;
    determining the number of electromagnetic interface devices incorporated into said sequence panel;
    subtracting said number of heating stages from said number of interface devices, said difference being representative of the number of cooling stages coupled to said sequence panel;
    determining the bandwidth of a cooling proportional band, and;
    controllably actuating said cooling stages in a manner to be substantially evenly distributed across said cooling proportional band.

* * * * *

UNITED STATES PATENT AND TRADEMARK OFFICE
CERTIFICATE OF CORRECTION

PATENT NO. : 4,630,221

DATED : December 16, 1986

INVENTOR(S) : Terry A. Heckenbach and Henry A. Gleason, III

It is certified that error appears in the above-identified patent and that said Letters Patent are hereby corrected as shown below:

Col. 3, Line 36, "disadvantge" should be --disadvantage--.

Col. 6, Line 19, "includs" should be --includes--.

Col. 6, Line 44, "4,534 511" should be --4,584,511--.

Col. 7, Line 33, "the same location" should be "that same location".

Col. 9, Line 33, "potentimeters" should be --potentiometer--.

Col. 12, Line 64, "load device" should be --load devices--.

Col. 13, Line 27, "may be setup" should be --may be for setup--.

Col. 15, Line 20, "by it, i.e.," should be --by it, e.g.,--.

UNITED STATES PATENT AND TRADEMARK OFFICE
CERTIFICATE OF CORRECTION

PATENT NO. : 4,630,221

DATED : December 16, 1986

INVENTOR(S) : Terry A. Heckenbach and Henry A. Gleason, III

It is certified that error appears in the above-identified patent and that said Letters Patent are hereby corrected as shown below:

Col. 17, Line 5, "R38  69 8K, 1%" should be --R38 69.8K, 1%--.

Signed and Sealed this

Ninth Day of February, 1988

Attest:

DONALD J. QUIGG

Attesting Officer

Commissioner of Patents and Trademarks